US011382100B2

(12) United States Patent
Bhattad et al.

(10) Patent No.: US 11,382,100 B2
(45) Date of Patent: Jul. 5, 2022

(54) MULTIPLE START SYMBOLS FOR NEW RADIO-UNLICENSED (NR-U) PHYSICAL UPLINK SHARED CHANNEL (PUSCH)

(71) Applicant: QUALCOMM Incorporated, San Diego, CA (US)

(72) Inventors: Kapil Bhattad, Bangalore (IN); Xiaoxia Zhang, San Diego, CA (US); Jing Sun, San Diego, CA (US); Ananta Narayanan Thyagarajan, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/248,679

(22) Filed: Feb. 2, 2021

(65) Prior Publication Data

US 2021/0160868 A1 May 27, 2021

Related U.S. Application Data

(62) Division of application No. 16/285,931, filed on Feb. 26, 2019, now Pat. No. 10,939,431.

(30) Foreign Application Priority Data

Mar. 1, 2018 (IN) .............................. 201841007755

(51) Int. Cl.
*H04W 72/04* (2009.01)
*H04W 74/00* (2009.01)
(Continued)

(52) U.S. Cl.
CPC ....... *H04W 72/0446* (2013.01); *H04W 16/14* (2013.01); *H04W 74/004* (2013.01); *H04W 74/0808* (2013.01)

(58) Field of Classification Search
CPC .............................. H04W 72/04; H04W 72/08
See application file for complete search history.

(56) References Cited

U.S. PATENT DOCUMENTS

2019/0150198 A1\* 5/2019 Sun ...................... H04L 5/0032
370/329
2019/0274137 A1 9/2019 Bhattad et al.

FOREIGN PATENT DOCUMENTS

EP 3439348 A1 2/2019
WO 2016137948 9/2016
(Continued)

OTHER PUBLICATIONS

Huawei et al., "NR Frame Structure on Unlicensed Bands", 3GPP DRAFT; R1-1801370, 3rd Generation Partnership Project (3GPP), Mobile Competence Centre; 650, Route Des Lucioles; F-06921 Sophia-Anti polis Cedex; France, vol. RAN WG1, No. Athens, Greece; Feb. 26, 2018-Mar. 2, 2018 Feb. 17, 2018, XP051397534, Retrieved from the Internet: URL:http://www.3gpp.org/ftp/tsg%5Fran/WG1%5FRL1/TSGR1%5F92/Docs/ [retrieved on Feb. 17, 2018], 7 pages.

(Continued)

*Primary Examiner* — Sulaiman Nooristany
(74) *Attorney, Agent, or Firm* — Liem T. Do

(57) ABSTRACT

Wireless communications systems and methods related to scheduling and communicating in an uplink direction over a medium shared by multiple network operating entities are provided. A first wireless communication device transmits, to a second wireless communication device, a message indicating an uplink allocation in a transmission slot, the uplink allocation including an allocation size based on an allowable listen-before-talk (LBT) delay in the transmission slot. The first wireless communication device receives, from the second wireless communication device, an uplink communication signal in the transmission slot, the uplink com- (Continued)

munication signal including an uplink data portion based on the allocation size and a filler portion associated with an LBT delay in the transmission slot.

20 Claims, 12 Drawing Sheets

(51) Int. Cl.
*H04W 16/14* (2009.01)
*H04W 74/08* (2009.01)

(56) References Cited

FOREIGN PATENT DOCUMENTS

| | | |
|---|---|---|
| WO | 2017052444 A1 | 3/2017 |
| WO | 2017170809 A1 | 10/2017 |

OTHER PUBLICATIONS

Intel Corporation: "NR Operation in Unlicensed Band," 3GPP Draft; R1-164181 Intel NR Unlicensed, 3rd Generation Partnership Project (3GPP), Mobile Competence Centre; 650, Route Des Lucioles; F-06921 Sophia-Antipolis Cedex; France, vol. RAN WG1, No. Nanjing, May 23, 2016-May 27, 2016, May 14, 2016, XP051096539, 3 pages, Retrieved from the Internet: URL: http://www.3gpp.org/ftp/tsg_ran/WG1_RL1/TSGR1_85/Docs/ [retrieved on May 14, 2016].
International Preliminary Report on Patentability—PCT/US2019/019850, The International Bureau of WIPO—Geneva, Switzerland, dated Sep. 10, 2020.
International Search Report and Written Opinion—PCT/US2019/019850—ISA/EPO—dated May 2, 2019.

\* cited by examiner

MULTIPLE START SYMBOLS FOR NEW RADIO-UNLICENSED (NR-U) PHYSICAL UPLINK SHARED CHANNEL (PUSCH)

CROSS REFERENCE TO RELATED APPLICATIONS

The present application is a divisional application of U.S. patent application Ser. No. 16/285,931, filed Feb. 26, 2019, which claims priority to and the benefit of India Patent Application No. 201841007755, filed Mar. 1, 2018, each of which is hereby incorporated by reference in its entirety as if fully set forth below and for all applicable purposes.

TECHNICAL FIELD

This application relates to wireless communication systems, and more particularly to scheduling and communicating in an uplink (UL) direction over a medium shared by multiple network operating entities.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communication for multiple communication devices, which may be otherwise known as user equipment (UE).

To meet the growing demands for expanded mobile broadband connectivity, wireless communication technologies are advancing from the LTE technology to a next generation new radio (NR) technology. One technique for expanding connectivity may be to extend the frequency operation range to higher frequencies since lower frequencies are becoming over-crowded. In addition, NR may provision for dynamic medium sharing among network operating entities in a shared spectrum and/or an unlicensed spectrum.

An approach to sharing a communication medium or spectrum among network operating entities is to employ a listen-before-talk (LBT) procedure to ensure a particular channel is clear before transmitting a message. For example, a BS may schedule a UL grant for a UE to transmit in a certain time period. The UE may perform an LBT prior to the scheduled time period. When the LBT is successful (e.g., the channel is clear), the UE may transmit a UL signal to the BS during the scheduled time period. However, the UE may or may not begin the transmission at the beginning of the scheduled time period depending on the LBT completion time. As such, the available transmission duration may vary. Since a UE may typically generate a transport block (TB) or a packet for the transmission before the scheduled transmission time, the TB or packet may or may not fit within the available transmission duration.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication, including transmitting, by a first wireless communication device to a second wireless communication device, a message indicating an uplink allocation in a transmission slot, the uplink allocation including an allocation size based on an allowable listen-before-talk (LBT) delay in the transmission slot; and receiving, by the first wireless communication device from the second wireless communication device, an uplink communication signal in the transmission slot, the uplink communication signal including an uplink data portion based on the allocation size and a filler portion associated with an LBT delay in the transmission slot.

In an additional aspect of the disclosure, a method of wireless communication including receiving, by a first wireless communication device from a second wireless communication device, a message indicating an uplink allocation in a transmission slot, the uplink allocation including an allocation size based on an allowable listen-before-talk (LBT) delay in the transmission slot; and transmitting, by the first wireless communication device to the second wireless communication device, an uplink communication signal in the transmission slot, the uplink communication signal including an uplink data portion based on the allocation size and a filler portion based on an LBT delay in the transmission slot.

In an additional aspect of the disclosure, an apparatus including a transceiver configured to: transmit, to a second wireless communication device, a message indicating an uplink allocation in a transmission slot, the uplink allocation including an allocation size based on an allowable listen-before-talk (LBT) delay in the transmission slot; and receive, from the second wireless communication device, an uplink communication signal in the transmission slot, the uplink communication signal including an uplink data portion based on the allocation size and a filler portion associated with an LBT delay in the transmission slot.

In an additional aspect of the disclosure, an apparatus including a transceiver configured to receive, from a second wireless communication device, a message indicating an uplink allocation in a transmission slot, the uplink allocation including an allocation size based on an allowable listen-before-talk (LBT) delay in the transmission slot; and transmit, to the second wireless communication device, an uplink communication signal in the transmission slot, the uplink communication signal including an uplink data portion based on the allocation size and a filler portion based on an LBT delay in the transmission slot.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
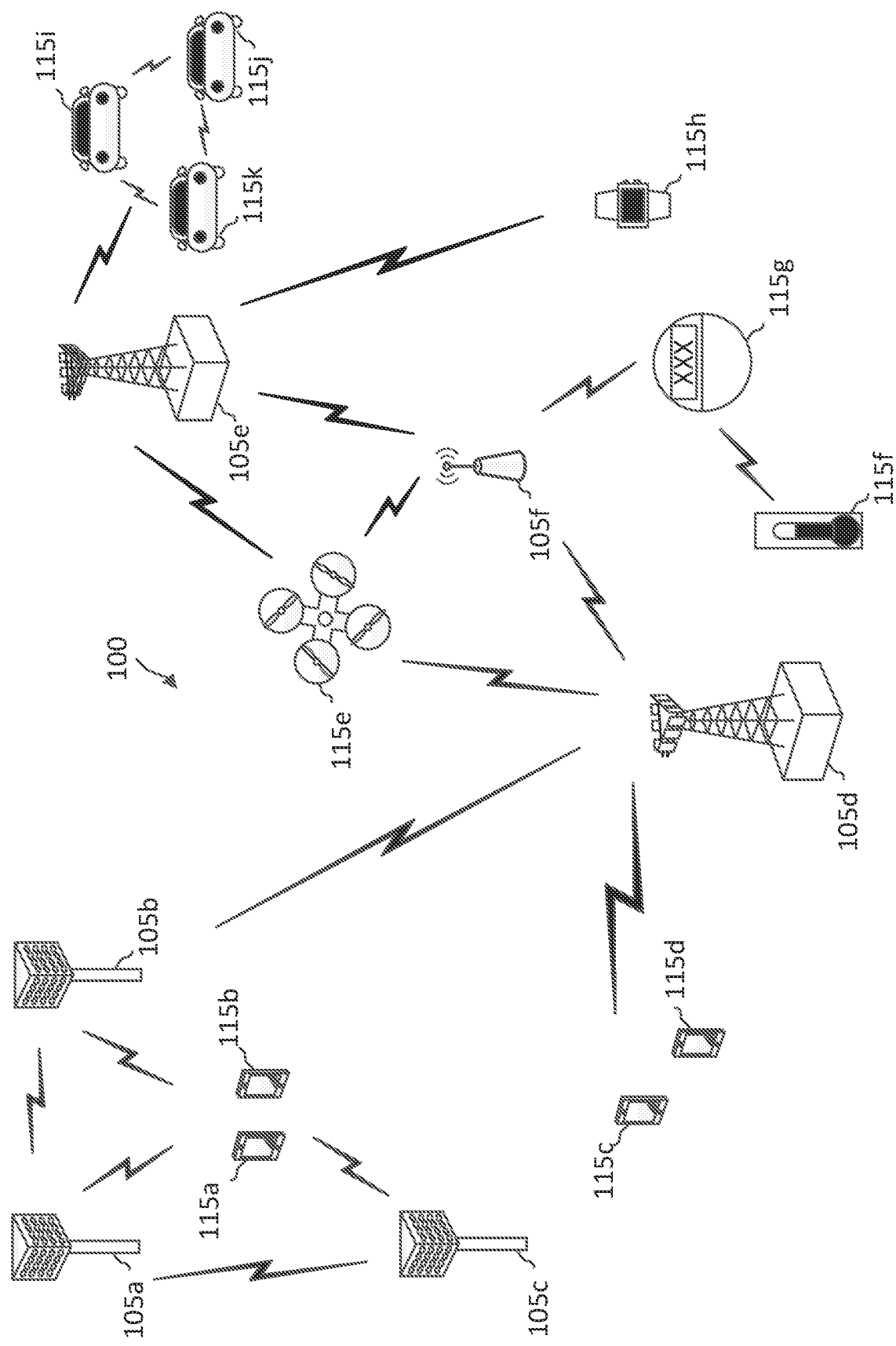
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms for scheduling and communicating in an uplink (UL) direction over a medium or spectrum shared by multiple network operating entities. In the disclosed embodiments, a BS may consider LBT delays during scheduling. For example, the BS may determine an allocation in a transmission slot for a UE based on an allowable LBT delay at the UE. To account for a potential LBT delay at the UE, the allocation may include a shortened duration or reduced size including fewer symbols than symbols available in the transmission slot. The BS may transmit a UL grant to the UE in an earlier transmission slot. The UE may perform an LBT procedure prior to the scheduled transmission slot. When the LBT is successful and completes before the allowable LBT delay in the scheduled transmission slot, the UE may transmit a UL communication signal to the BS. The UL communication signal includes a UL data portion carrying encoded UL information bits corresponding to the allocation size. When the LBT procedure completes at an earlier time than the allowable LBT delay, the UL communication can include a filler portion so that the UL communication signal occupies the medium for the entire remaining duration in the scheduled transmission slot after the LBT is completed. The filler portion serves to retain access to the medium for a next transmission slot. The filler portion can include filler data (e.g., non-informational), pilot symbols, and/or a repetition of at least a portion of the encoded UL information bits. The filler portion can be transmitted before the UL data portion, after the UL data portion, or within the UL data portion.

In one embodiment, the BS can determine a plurality of candidate starting symbols within the transmission slot for the UL allocation based on the allowable LBT delay. The UE can select a starting symbol from among the plurality of candidate starting symbols for the UL transmission based on a completion time of the LBT procedure. The BS may perform blind detection to detect the beginning of the UL data portion upon receiving the UL communication signal.

In one embodiment, the BS can determine a delayed starting symbol in the transmission slot for the UL allocation based on the allowable LBT delay. The UE may transmit the UL data portion beginning at the delayed starting symbol irrespective of the completion time of the LBT procedure as long as the LBT procedure completes within the allowable LBT delay. When the LBT procedure completes before the delayed starting symbol, the UE may insert a filler signal before the UL signal. Since the delayed starting symbol is independent of an LBT completion time at the UE, the BS may detect whether a UL transmission signal is present in the transmission slot. Upon detecting the presence of a UL transmission signal, the BS may recover and decode the UL data based on the delayed starting symbol without blind detection on the starting symbol.

Aspects of the present application can provide several benefits. For example, the allocation with the shortened duration can allow a UE to generate a transport block (TB) for the transmission prior to the transmission time and transmit the TB after completing a successful LBT procedure without applying puncturing or rate-matching. The inclusion of pilot information and/or repetitions of encoded information in the filler portion can improve performance, for example, channel estimation, frequency offset estimation, and/or data demodulation performance at the BS.

FIG. 1 illustrates a wireless communication network 100 according to some embodiments of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of 3 dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as internet of everything (IoE) devices. The UEs 115*a*-115*d* are examples of mobile smart phone-type devices accessing network 100 A UE 115 may also be a machine specifically configured for connected communication, including machine type communication (MTC), enhanced MTC (eMTC), narrowband IoT (NB-IoT) and the like. The UEs 115*e*-115*k* are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-hop configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system bandwidth into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system bandwidth. The system bandwidth may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational bandwidth or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication tha UL communication. A UL-centric subframe may include a longer duration for UL communication tha UL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, the MIB, the RMSI, and/or the OSI in the form of synchronization signal blocks (SSBs).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively.

After receiving the PSS and SSS, the UE 115 may receive a MIB, which may be transmitted in the physical broadcast channel (PBCH). The MIB may include system information for initial network access and scheduling information for RMSI and/or OSI. After decoding the MIB, the UE 115 may receive RMSI and/or OSI. The RMSI and/or OSI may include radio resource configuration (RRC) configuration information related to random access channel (RACH) procedures, paging, physical uplink control channel (PUCCH), physical uplink shared channel (PUSCH), power control, SRS, and cell barring. After obtaining the MIB and/or the SIBs, the UE 115 can perform a random access procedure to establish a connection with the BS 105. After establishing a connection, the UE 115 and the BS 105 can enter a normal operation stage, where operational data may be exchanged.

In an embodiment, the network 100 may operate over a shared channel, which may include a licensed spectrum, a shared spectrum, and/or an unlicensed spectrum, and may support dynamic medium sharing. The BSs 105 and the UEs 115 may communicate over the shared channel by performing LBT procedures. For example, after a BS 105 gain access or a transmission opportunity (TXOP) in the shared channel, the BS 105 may schedule a UE 115 for a UL transmission in a certain time period (e.g., a transmission slot within the TXOP). The UE 115 may listen to the channel by performing an LBT procedure prior to the scheduled time period. When the LBT is successful or the channel is clear, the UE 115 may transmit a UL communication signal, such as a PUSCH signal or a long PUCCH signal, to the BS 105. Since the completion time and/or the result of the LBT procedure are unknown ahead of time, the UE 115 may or may not be able to transmit in the scheduled time period. In addition, the UE 115 may or may not be able to start transmission at the beginning of the scheduled time period. The BS 105 may determine the UL schedule by considering potential delays that can occur with LBT or a maximum allowable LBT delay. Mechanisms for the BSs 105 and the UEs 115 to communicate in a shared medium with LBT delay considerations are described in greater detail herein.

Figure 2:
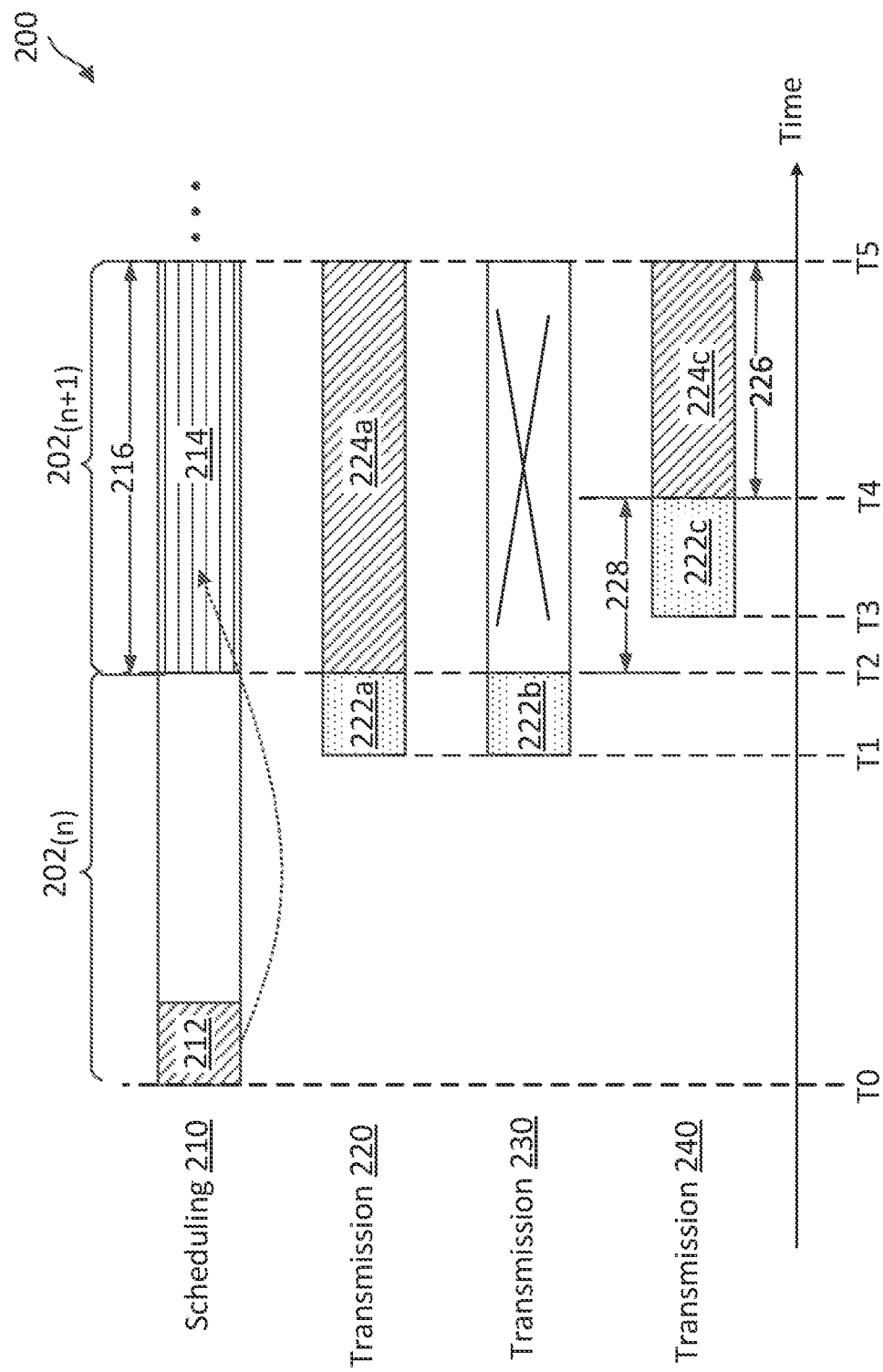
FIG. 2 illustrates example an uplink (UL) transmission scenarios according to some embodiments of the present disclosure.

FIG. 2 is a timing diagram illustrating a UL communication scenario 200 according to some embodiments of the present disclosure. The scenario 200 may correspond to UL communications between BSs (e.g., the BSs 105) and UEs (e.g., the UEs 115) in a network (e.g., the network 100) over a shared medium when the BSs 105 determine UL schedules without considering LBT delay. In FIG. 2, the x-axis represents time in some constant units. FIG. 2 illustrates two transmission slots 202 for purposes of simplicity of discussion, though it will be recognized that embodiments of the present disclosure may scale to any suitable number of transmission slots 202 (e.g., about, 3, 4, 5, 10, or more). The transmission slots 202 are shown as $202_{(n)}$ and $202_{(n+1)}$. The transmission slot $202_{(n)}$ begins at time T0 and the transmission slot $202_{(n+1)}$ begins at time T2. Each transmission slot 202 may span a suitable duration and may vary depending on the embodiments. In some embodiments, each transmission slot 202 may include a duration of about 0.5 milliseconds (ms) or about 1 ms. While the transmission slots 202 are shown as consecutive in time, in some embodiments, the transmission slots 202 may be spaced apart in time depending on the channel status (e.g., busy or clear).

As an example, a BS transmits a UL grant 212 to a UE in a transmission slot $202_{(n)}$. The BS may transmit the UL grant 212 in a control portion of the transmission slot $202_{(n)}$. The UL grant 212 may indicate an allocation 214 in a subsequent transmission slot $202_{(n+1)}$. The BS may determine an allocation size for the allocation 214, for example, based on a payload size in a scheduling request received from the UE. The BS may allocate time-frequency resources and assign a modulation coding scheme (MCS) for the allocation 214, for example, based on a payload size in a scheduling request received from the UE. The UL grant 212 may indicate the allocated time-frequency resource and the assigned MCS. The allocation or the allocated resource may span a number of subcarriers or tones in frequency and a number of OFDM symbols (e.g., PUSCH data symbols) in time. For example, the allocation 214 or the number of allocated symbols spans a duration 216.

When the UE receives the UL grant 212, the UE may perform an LBT procedure 222 prior to the transmission slot $202_{(n+1)}$ (e.g., at time T1). However, the result of the LBT procedure 222 and/or the completion time of the LBT procedure 222 may vary depending on transmission activities of other nodes sharing the medium.

The transmission timeline 220 shows an example of the UE completing an LBT procedure 222a at the beginning of the transmission slot $202_{(n+1)}$ (e.g., at time T1) with a successful result (e.g., the channel is clear). Thus, the UE may transmit a UL data signal 224a (e.g., a PUSCH signal or a long PUCCH signal) in the transmission slot $202_{(n+1)}$ spanning the allocated duration 216.

The transmission timeline 230 shows an example of the UE completing an LBT procedure 222b at the beginning of the transmission slot $202_{(n+1)}$ (e.g., at time T2) with a failure result (e.g., the channel is occupied). Thus, the UE may refrain from transmitting during the allocated duration 216 as shown by the cross.

The transmission timeline 240 shows an example of the UE beginning an LBT procedure 222c at time T3 and completing the LBT procedure 222c after the beginning of the transmission slot $202_{(n+1)}$ (e.g., at time T4) with a successful result. The UE may transmit a UL data signal 224c in the remaining allocated duration 216 within the transmission slot $202_{(n+1)}$. The UL data signal 224c has a reduced duration 226 compared to the allocated duration 216.

In an embodiment, upon receiving the UL grant 212, the UE may generate a TB for the transmission based on the allocated resources and assigned MCS. For example, the UE may determine a TB size based on the amount of the allocated resources (e.g., the number of data symbols in time and the number of subcarriers in frequency) and the assigned MCS. The UE may generate the TB before the transmission time, for example, during the transmission slot $202_{(n)}$. Thus, when the LBT procedure 222c completes at a later time in the transmission slot $202_{(n+1)}$, the UE may adjust the generated TB such that the UL data signal 224c can be transmitted within the duration 226 (e.g., including a smaller number of data symbols than the allocated resources). Thus, in such an embodiment, the UE may rate match for the reduced symbols with an updated TB size for the reduced allocation. Since the TB size, channel encoding, rate matching may all need to be updated based on when an LBT passes, implementation of such a design may be very challenging.

In one embodiment, the UE may apply puncturing to reduce the number of data symbols required for carrying the TB. Puncturing refers to dropping of one or more data symbols, for example, at the beginning of the TB during the transmission to account for the delay 228 caused by the LBT procedure 222c. The dropped symbols can be recovered with retransmissions. When using code block group (CBG)-level acknowledgement (ACK)/not-ACK (NACK) feedback-based retransmissions, the retransmissions can include only the codeblock (CB) or CBs corresponding to the dropped symbols. While retransmissions can recover the dropped symbols, retransmissions can be inefficient and degrade performance (e.g., a block error rate (BLER) performance).

In one embodiment, the UE may apply rate-matching to reduce the number of data symbols required for carrying the TB, but without updating the TB size (rate matching for reduced symbols with fixed TB size). For example, the UE may perform rate-matching to the TB such that the TB can be carried using the available number of data symbols in the reduced duration 226. However, rate-matching may require some processing time and the number of available symbols (e.g., the reduced duration 226) is not known until the LBT procedure 222c has completed. Thus, it may be difficult for the UE in terms of processing timeline to perform rate-matching after the LBT procedure 222c.

Figure 3:
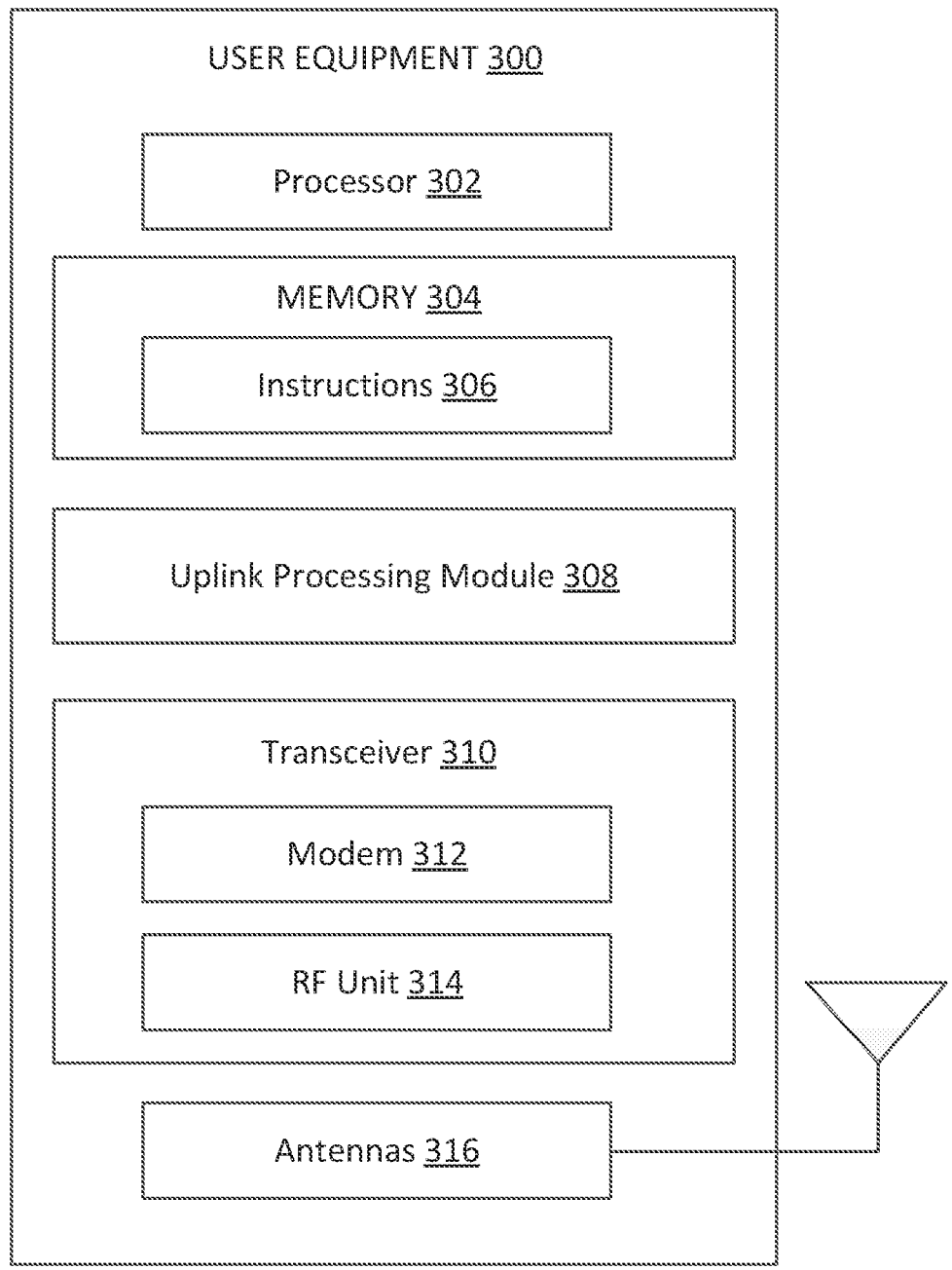
FIG. 3 is a block diagram of an exemplary user equipment (UE) according to embodiments of the present disclosure.

FIG. 3 is a block diagram of an exemplary UE 300 according to embodiments of the present disclosure. The UE 300 may be a UE 115 as discussed above. As shown, the UE 300 may include a processor 302, a memory 304, a UL processing module 308, a transceiver 310 including a modem subsystem 312 and a radio frequency (RF) unit 314, and one or more antennas 316. These elements may be in direct or indirect communication with each other, for example via one or more buses.

The processor 302 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 304 includes a non-transitory computer-readable medium. The memory 304 may store instructions 306. The instructions 306 may include instructions that, when executed by the processor 302, cause the processor 302 to perform the operations described herein with reference to the UEs 115 in connection with embodiments of the present disclosure, for example, aspects of FIGS. 5-14. Instructions 306 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The UL processing module 308 may be implemented via hardware, software, or combinations thereof. For example, the UL processing module 308 may be implemented as a processor, circuit, and/or instructions 306 stored in the memory 304 and executed by the processor 302. The UL processing module 308 may be used for various aspects of the present disclosure, for example, aspects of FIGS. 5-14. For example, the UL processing module 308 is configured to receive UL grants from a BS (e.g., the BSs 105), generate TBs based on received UL grants, perform LBT procedures, generate fillers (e.g., including filler bits, pilot information, or repetitions of data symbols carrying encoded information in the TB) based on received UL grants and LBT completion time, generate UL signals to carry a TB and fillers, and/or transmit UL signals to the BS, as described in greater detail herein.

As shown, the transceiver 310 may include the modem subsystem 312 and the RF unit 314. The transceiver 310 can be configured to communicate bi-directionally with other devices, such as the BSs 105. The modem subsystem 312 may be configured to modulate and/or encode the data from the memory 304, and/or the UL processing module 308 according to a modulation and coding scheme (MCS), e.g., a low-density parity check (LDPC) coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 115 or a BS 105. The RF unit 314 may be further configured to perform analog beamforming in conjunction with the digital beamforming. Although shown as integrated together in transceiver 310, the modem subsystem 312 and the RF unit 314 may be separate devices that are coupled together at the UE 115 to enable the UE 115 to communicate with other devices.

The RF unit 314 may provide the modulated and/or processed data, e.g. data packets (or, more generally, data messages that may contain one or more data packets and other information), to the antennas 316 for transmission to one or more other devices. The antennas 316 may further receive data messages transmitted from other devices. The antennas 316 may provide the received data messages for processing and/or demodulation at the transceiver 310. The antennas 316 may include multiple antennas of similar or different designs in order to sustain multiple transmission links. The RF unit 314 may configure the antennas 316.

Figure 4:
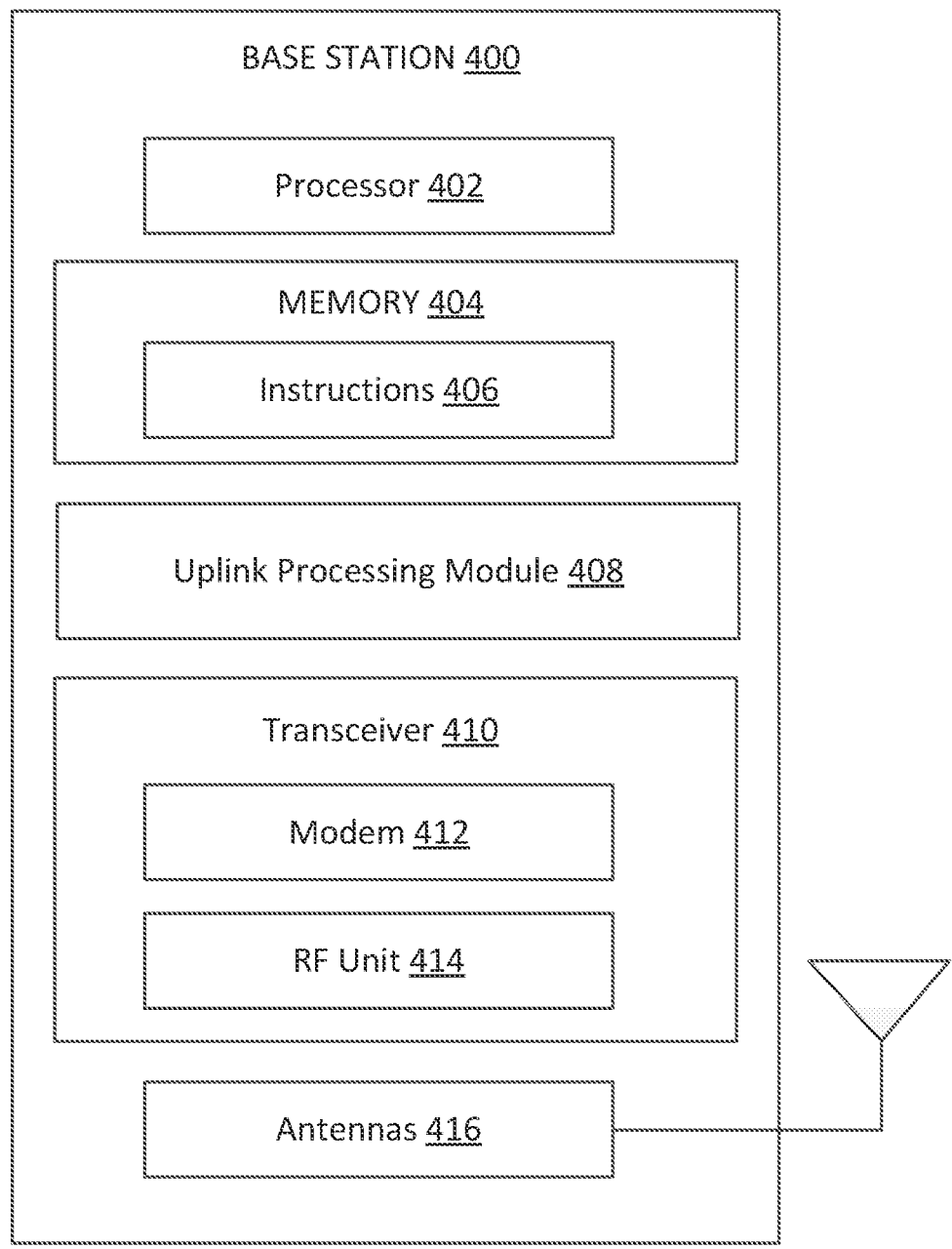
FIG. 4 is a block diagram of an exemplary base station (BS) according to embodiments of the present disclosure.

FIG. 4 is a block diagram of an exemplary BS 400 according to embodiments of the present disclosure. The BS 400 may be a BS 105 as discussed above. As shown, the BS 400 may include a processor 402, a memory 404, a UL processing module 408, a transceiver 410 including a modem subsystem 412 and a RF unit 414, and one or more antennas 416. These elements may be in direct or indirect communication with each other, for example via one or more buses.

The processor 402 may have various features as a specific-type processor. For example, these may include a CPU, a DSP, an ASIC, a controller, a FPGA device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 404 may include a non-transitory computer-readable medium. The memory 404 may store instructions 406. The instructions 406 may include instructions that, when executed by the processor 402, cause the processor 402 to perform operations described herein, for example, aspects of FIGS. 5-14. Instructions 406 may also be referred to as code, which may be interpreted broadly to include any type of computer-readable statement(s) as discussed above with respect to FIG. 3.

The UL processing module 408 may be implemented via hardware, software, or combinations thereof. For example, the UL processing module 408 may be implemented as a processor, circuit, and/or instructions 406 stored in the memory 404 and executed by the processor 402. The UL processing module 408 may be used for various aspects of the present disclosure, for example, aspects of FIGS. 5-14. For example, the UL processing module 408 is configured to determine allowable LBT delays, schedule uplink transmissions, determine uplink resources taking into account of allowable LBT delays, determine candidate starting symbols for the allocations based on the allowable LBT delays, transmit UL grants indicating allocated resources and/or candidate starting symbols to UEs (e.g., the UEs 115), determine configurations for UE to include fillers (e.g., including filler bits, pilot information, or repetitions of encoded UL information) in UL transmissions, and/or receive UL signals from UEs based on UL grants, as described in greater detail herein.

As shown, the transceiver 410 may include the modem subsystem 412 and the RF unit 414. The transceiver 410 can be configured to communicate bi-directionally with other devices, such as the UEs 115 and/or another core network element. The modem subsystem 412 may be configured to modulate and/or encode data according to a MCS, e.g., a LDPC coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115 or 300. The RF unit 414 may be further configured to perform analog beamforming in conjunction with the digital beamforming. Although shown as integrated together in transceiver 410, the modem subsystem 412 and the RF unit 414 may be separate devices that are coupled together at the BS 105 to enable the BS 105 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices and provide the received data messages for processing and/or demodulation at the transceiver 410. The antennas 416 may include multiple antennas of similar or different designs in order to sustain multiple transmission links.

Figure 5:
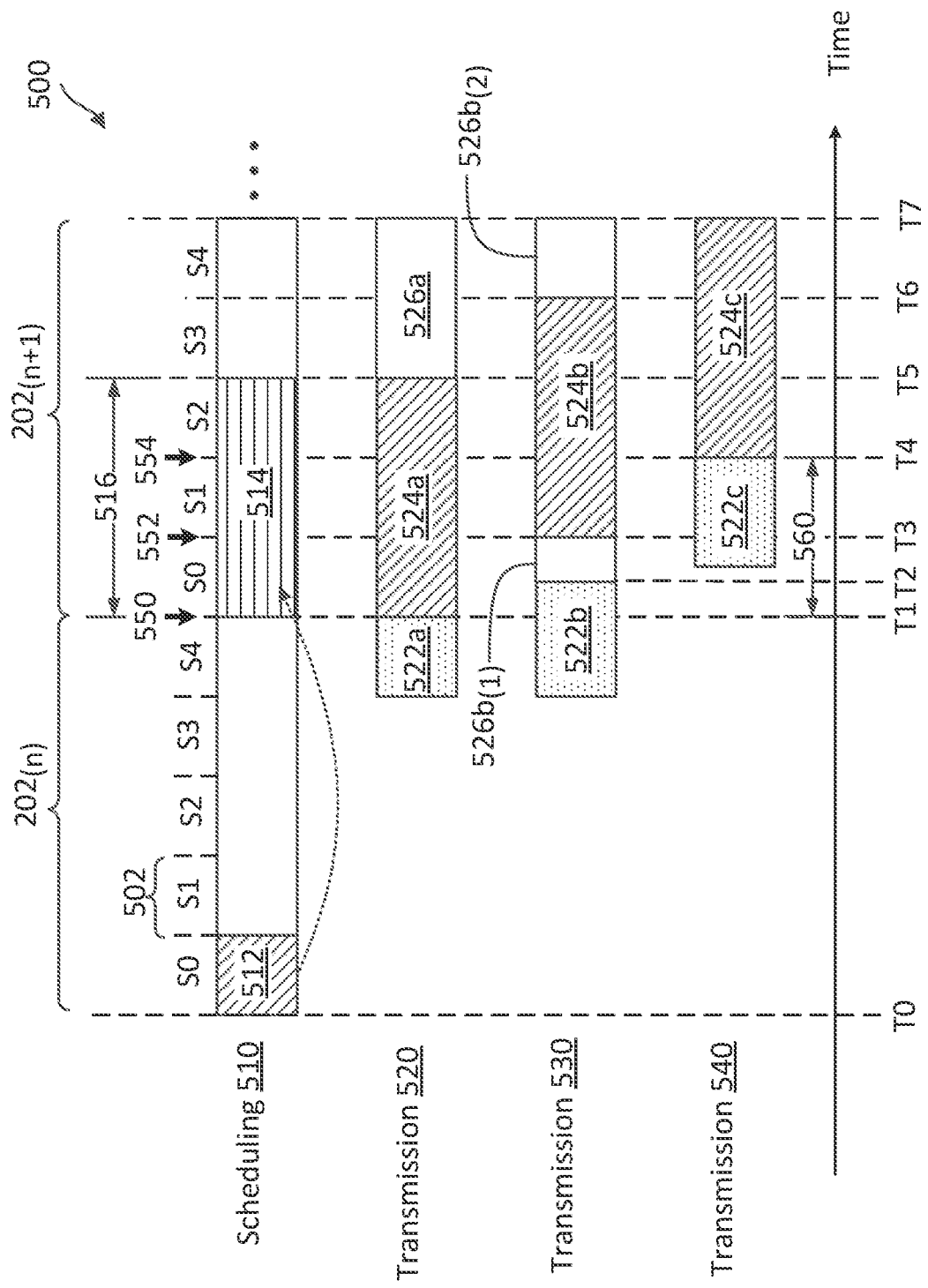
FIG. 5 is a timing diagram illustrating a UL scheduling and transmission scheme according to some embodiments of the present disclosure.
Figure 6:
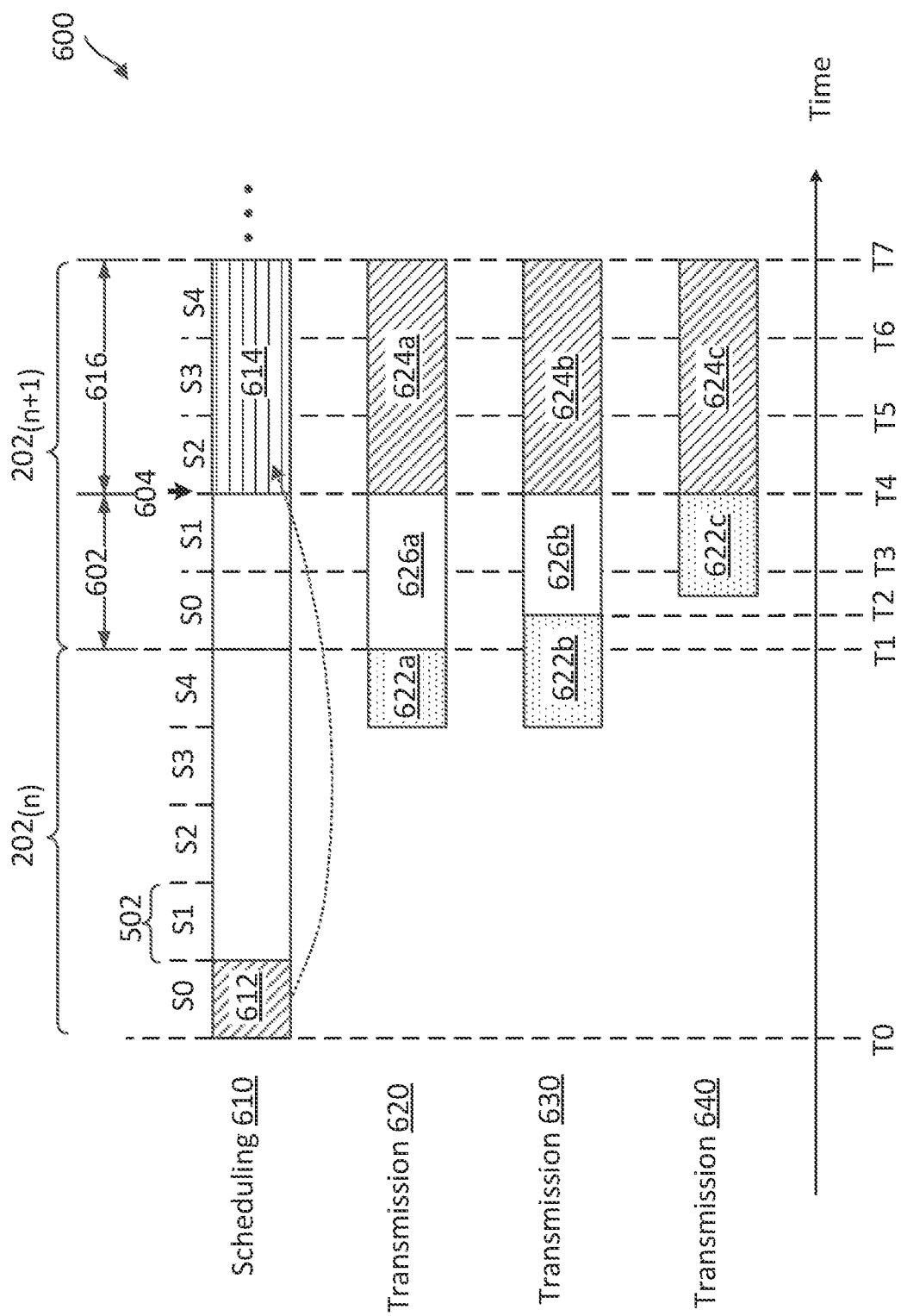
FIG. 6 is a timing diagram illustrating a UL scheduling and transmission scheme according to some embodiments of the present disclosure.

FIGS. 5-6 illustrate various mechanisms for a BS (e.g., the BSs 105) to schedule UL transmissions with considerations of LBT delays at a UE (e.g., the UEs 115 and 300). In FIGS. 5 and 6, the x-axes represent time in some constant units.

FIG. 5 is a timing diagram illustrating a UL scheduling and transmission scheme 500 according to some embodiments of the present disclosure. The scheme 500 may be employed by the UEs 115 and 300 and the BSs 105 and 400. Similar to the scenario 200, the scheduling timeline 510 shows a BS transmitting a UL grant 512 to a UE in a transmission slot $202_{(n)}$, where the UL grant 512 indicates an allocation 514 for the UE in a subsequent transmission slot $202_{(n+1)}$. However, the allocation 514 has a shortened duration 516 spanning a portion of the transmission slot $202_{(n+1)}$ instead of the entire duration 216 as the allocation 214 shown in the scenario 200.

For example, each transmission slot 202 may include about five symbols 502 (e.g., OFDM symbols) indexed S0 to S4. The BS may determine an allocation size (e.g., the duration 516 or the number of symbols 502) by considering an allowable LBT delay at the UE. For example, the BS may allow a maximum LBT delay of about two symbols 502, and thus the allocation 514 may include about three symbols 502 as shown.

When the UE receives the UL grant 512, the UE may perform an LBT procedure 522 (e.g., the LBT procedure 222) prior to the transmission slot $202_{(n+1)}$ (e.g., beginning at time T1). Similar to the scenario 200, the result of the LBT procedure 522 and/or the completion time of the LBT procedure 522 may vary depending on transmission activities of other nodes sharing the medium.

The transmission timeline 520 shows an example of the UE completing an LBT procedure 522a at the beginning of the transmission slot $202_{(n+1)}$ (e.g., at time T1) with a successful result (e.g., a channel clear status). Thus, the UE may transmit a UL data signal 524a (e.g., a PUSCH signal or a long PUCCH signal) in the transmission slot $202_{(n+1)}$. As shown, the UL data signal 524a includes a duration of three symbols 502 (e.g., indexed S0, S1, and S2) based on the allocation 514. In addition, the UE may transmit a filler signal 526a (e.g., shown as a blank box) after the UL data signal 524a until the end of the transmission slot $202_{(n+1)}$, for example, between time T5 and T7 or in the symbols 502 indexed S3 and S4. The symbols 502 indexed S3 and S4 in which the filler signal 526a is transmitted may be referred to as filler symbols.

The transmission timeline 530 shows an example of the UE completing an LBT procedure 522b at time T2 after the beginning of the transmission slot $202_{(n+1)}$ with a successful result. Since the delay from the LBT procedure 522b is within the maximum LBT delay of two symbols 502, the UE may transmit a UL data signal 524b beginning at a next symbol boundary (e.g., at time T3). In addition, the UE may transmit a filler signal 526b in the transmission slot $202_{(n+1)}$. The filler signal 526b includes a portion $526b_{(1)}$ and a portion $526b_{(1)}$. The portion $526b_{(1)}$ is transmitted before the UL data signal 524b between time T2 and T3 (e.g., a partial symbol 502) to fill in the gap time (e.g., between time T2 and T3) in order to align the start of the UL data signal 524 to a symbol boundary. The filler portion $526b_{(1)}$ serves to keep the medium occupy so that other nodes may not mistakenly determine that the medium is free and gain access to the medium. The portion $526b_{(2)}$ is transmitted after the UL data signal 524b, for example, between time T6 to T7 or in the symbol 502 indexed S4, until the end of the transmission slot $202_{(n+1)}$.

The transmission timeline 540 shows an example of the UE completing an LBT procedure 522c at time T4 after the beginning of the transmission slot $202_{(n+1)}$ with a successful result. Similar to the timeline 530, the delay from the LBT procedure 522c is within the maximum LBT delay of two symbols 502. Thus, the UE may transmit a UL data signal 524c in the transmission slot $202_{(n+1)}$. Since the LBT procedure 522c completes at a symbol boundary and the UL data signal 524c occupies the remaining three symbols 502 (e.g., indexed S2, S3 and S4) in the transmission slot $202_{(n+1)}$, the UE is not required to transmit any filler signal (e.g., the filler signal 526).

To facilitate the scheme 500, the BS may determine an allocation size or duration for the allocation 514 based on a maximum allowable LBT delay 560 at the UE. The BS may determine a number of candidate starting symbols 550, 552, and 554 (e.g., S0, S1, and S2) and allow the UE to select a starting symbol based on the completion time of an LBT procedure 522 at the UE. The BS may reserve resources corresponding to all candidate starting symbols 550, 552, and 554. The BS may indicate the candidate starting symbols 550, 552, and 554 in the UL grant 512. In some other embodiments, the BS may indicate a range or a set of allowable starting symbols within the transmission slot $202_{(n+1)}$. The set of allowable starting symbols may be contiguous symbols 502 in the transmission slot $202_{(n+1)}$ or non-contiguous symbols 502 in the transmission slot $202_{(n+1)}$. In addition, the BS may configure the UE to transmit filler data, pilots, or copies of encoded UL data (e.g., a portion of the UL data signal 524) in the filler signals 526, as described in greater detail herein.

During UL reception, the BS may perform blind detection to detect the start of a UL data signal based on the configured candidate starting symbols. After detecting the start of a UL data signal 524, the BS may recover or decode UL data from the UL data signal 524. In an embodiment, the BS may determine the starting symbol 502 of the UL data signal 524 based on demodulation reference signal (DMRS) detection in the different candidate starting symbols.

As can be seen in the scheme 500, since the UE is given an allocation 514 with an allocation size accounting for an LBT delay at the UE, the UE may generate a TB ahead of the transmission time and avoid having to apply puncturing and/or rate-matching to reduce the transmission duration (e.g., the number of symbols or the TB size) after completing an LBT as in the scenario 200 (e.g., the transmission timeline 240). Thus, the scheme 500 can improve transmission performance and may not require a stringent processing time on the UE.

In an embodiment, the UL data signals 524a, 524b, and 524c may include pilot information or DMRSs in certain symbols 502. A DMRS is generated from a scrambling sequence based on the symbol index of the symbol in which the DMRS is transmitted. In one embodiment, a DMRS in a UL data signal 524 is generated based on the symbol index within the transmission slot $202_{(n+1)}$. In other words, a DMRS in a first symbol 502 of the UL data signal 524a is generated based on a symbol index of 0, a DMRS in a first symbol 502 of the UL data signal 524b is generated based on a symbol index of 1, and a DMRS in a first symbol of 502 of the UL data signal 524c is generated based on a symbol index of 2. In another embodiment, a DMRS in a UL data signal 524 is generated based on a symbol index relative to the starting symbols of the UL data signal 524. In other words, a DMRS in a UL data signal 524 is generated from a scrambling sequence independent of the starting symbol of the UL data signal 524. For example, a DMRS in a first symbol 502 of a UL data signal 524a, 524b, or 524c is generated based on a symbol index of 0.

FIG. 6 is a timing diagram illustrating a UL scheduling and transmission scheme 600 according to some embodiments of the present disclosure. The scheme 600 may be employed by the UEs 115 and 300 and the BSs 105 and 400. Similar to the scheme 500, the scheduling timeline 610 shows a BS transmitting a UL grant 612 to a UE in a transmission slot $202_{(n)}$, where the UL grant 612 indicates an allocation 614 with a shortened duration 616 (e.g., including about three symbols 502) in a transmission slot $202_{(n+1)}$. However, in the scheme 600, the BS may determine a delayed starting symbol 604 and an allocation size for the allocation 614 based on a maximum allowable LBT delay 602 at the UE instead of multiple candidate starting symbols 550, 552, 554 as in the scheme 500. For example, for a transmission slot of about five symbols 502, the maximum allowable LBT delay may be about two symbols 502 long and the allocation 614 may have duration of about three symbols 502

The transmission timeline 620 shows an example of the UE completing an LBT procedure 622a at the beginning of the transmission slot $202_{(n+1)}$ (e.g., beginning at time T1) with a successful result (e.g., a channel clear status). Thus, the UE may transmit a UL data signal 624a (e.g., a PUSCH signal or a long PUCCH signal) in the transmission slot $202_{(n+1)}$. As shown, the UE transmits a filler signal 626a from time T1 to time T4 and begins the transmission of the UL data signal 624a at the delayed starting symbol 604 (e.g., at time T4).

The transmission timeline 630 shows an example of the UE completing an LBT procedure 622b at time T2 after the beginning of the transmission slot $202_{(n+1)}$ with a successful result. Since the LBT procedure 622b is completed before the delayed starting symbol 604, the UE may transmit a UL data signal 624b in the transmission slot $202_{(n+1)}$. Similar to the transmission timeline 620, the UE may transmit a filler signal 626b before the UL data signal 624b between time T2 and time T4.

The transmission timeline 640 shows an example of the UE completing an LBT procedure 622c at time T4 after the beginning of the transmission slot $202_{(n+1)}$ with a successful result. Since the LBT procedure 622c is completed at the beginning of the delayed starting symbol 604, the UE may transmit a UL data signal 624c in the transmission slot $202_{(n+1)}$ without any filler signal.

Similar to the scheme 500, the scheme 600 allows a UE to generate a TB for the transmission ahead of time without having to reduce the transmission duration using puncturing and/or rate-matching to compensate for the LBT delay. Thus, the scheme 600 can improve performance without a stringent processing time requirement at the UE. In addition, since the allocation 614 has a fixed delayed starting symbol 604, blind detection may not be required at the BS when using the scheme 600. Thus, the scheme 600 can reduce implementation complexity at the BS compared to the scheme 500. The BS can configure the UE to transmit filler data, pilots, or copies of encoded UL data in the filler signals 626 to further improve performance, as described in greater detail herein.

FIGS. 7-10 illustrate various mechanisms for a UE (e.g., the UEs 115 and 300) to transmit a filler signal (e.g., the filler signals 526 and 626) in a transmission slot (e.g., the transmission slots 202) when a UL allocation (e.g., the allocations 514 and 614) has a reduced size (e.g., the reduced durations 516 and 616). In FIGS. 7-10, the x-axes represent time in some constant units.

Figure 7:
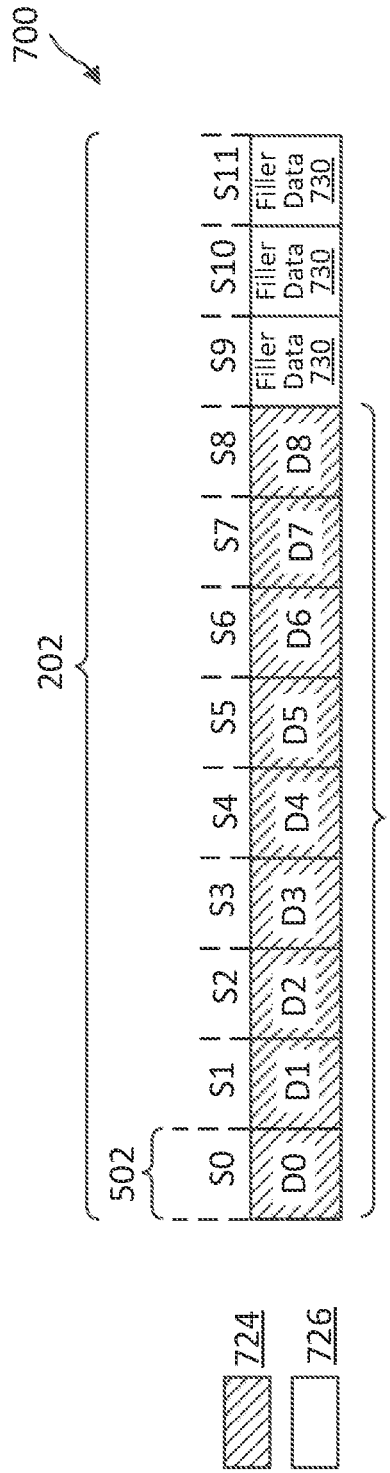
FIG. 7 is a timing diagram illustrating a UL transmission scheme according to some embodiments of the present disclosure.

FIG. 7 is a timing diagram illustrating a UL transmission scheme 700 according to some embodiments of the present disclosure. The scheme 700 may be employed by the UEs 115 and 300 and the BSs 105 and 400. The scheme 700 can be used in conjunction with the schemes 500 or 600. For example, a transmission slot 202 may include about twelve symbols 502 indexed S0 to S11 and a BS may assign an allocation 714 including about nine symbols 502 (e.g., S0 to S8) in the transmission slot 202 to a UE. The UE may transmit a UL data signal 724 (e.g., shown as data symbols D0 to D9) according to the allocations 714 and a filler signal 726 including filler data 730 in the remaining symbols 502 (e.g., S9 to S11). The filler data 730 does not carry useful information and can be arbitrary data. The filler data 730 serves to occupy the medium until the end of the transmission slot 202. The BS may discard the filler data 730 upon reception.

Figure 8:
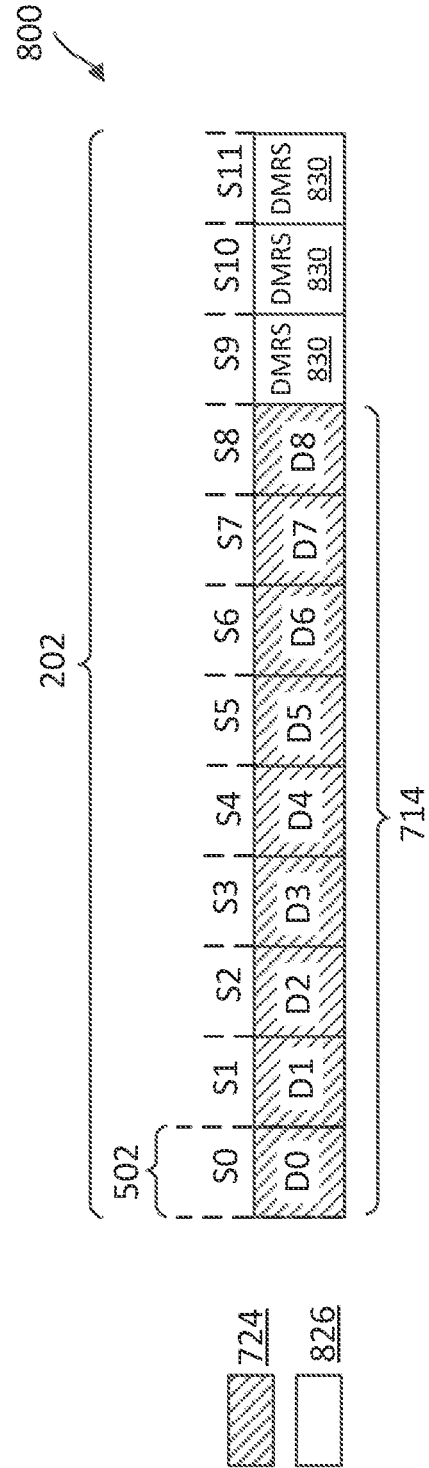
FIG. 8 is a timing diagram illustrating a UL transmission scheme according to some embodiments of the present disclosure.

FIG. 8 is a timing diagram illustrating a UL transmission scheme 800 according to some embodiments of the present disclosure. The scheme 800 may be employed by the UEs 115 and 300 and the BSs 105 and 400. The scheme 800 can be used in conjunction with the schemes 500 or 600. The scheme 800 is illustrated using a substantially similar slot and allocation configuration as in the scheme 700. However, the BS may configure the UE to transmit a filler signal 826 including DMRSs 830 (e.g., pilot symbols) in the remaining symbols 502 (e.g., S10 to S12) after transmitting the UL data signal 724. The BS can determine a channel estimate based on the DMRSs 830 in addition to DMRSs that are carried in certain symbols 502 within the UL data signal 724. Thus, the scheme 800 can improve performance. In some embodiments, the DMRSs 830 in the filler signal 826 may be repetitions of DMRSs in the UL data signal 724. In some other embodiments, the DMRSs 830 in the filler signal 826 may be generated from a different scrambling sequence than the DMRSs in the UL data signal 724.

Figure 9:
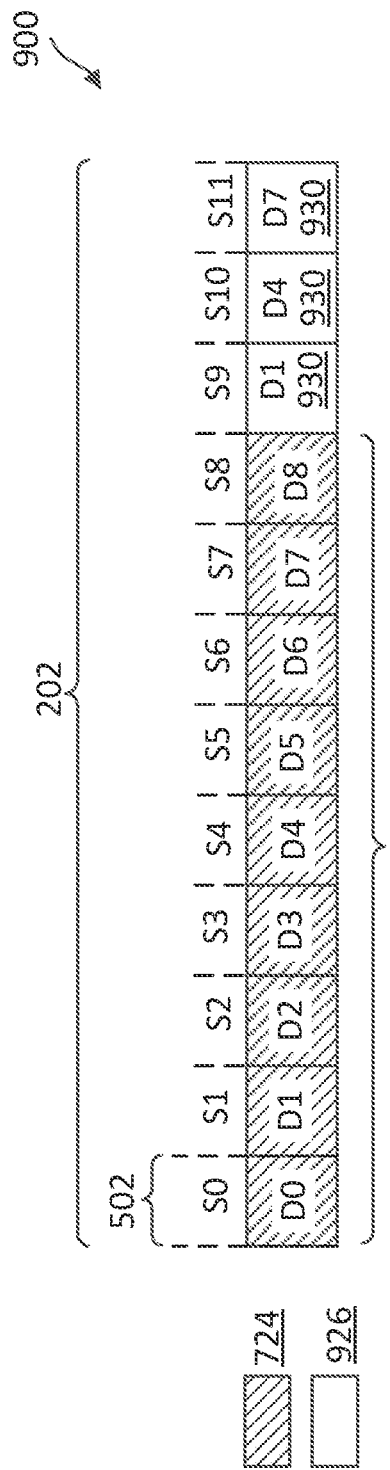
FIG. 9 is a timing diagram illustrating a UL transmission scheme according to some embodiments of the present disclosure.

FIG. 9 is a timing diagram illustrating a UL transmission scheme 900 according to some embodiments of the present disclosure. The scheme 900 may be employed by the UEs 115 and 300 and the BSs 105 and 400. The scheme 900 can be used in conjunction with the schemes 500 or 600. The scheme 900 is illustrated using a substantially similar slot and allocation configuration as in the schemes 700 and 800. However, the BS may configure the UE to transmit a filler signal 926 including a repetition of a portion (e.g., one or more data symbols) of the UL data signal 724. As shown, the filler signal 926 can include repeating data symbols 930 of the UL data signal 724. For example, the UL data signal 724 may include three CBs, where the first CB may be transmitted in symbols D0, D1, and D2, the second CB may be transmitted in symbols D3, D4, and D5, and the third CB may be transmitted in symbols D6, D7, and D8. The repeating data symbols 930 can be selected such that one data symbol of each CB is repeated to provide a uniform improvement across the CBs. As shown, the repeating data symbols 930 include symbols D1, D4, and D7 from the first, second, and third CBs, respectively.

Figure 10:
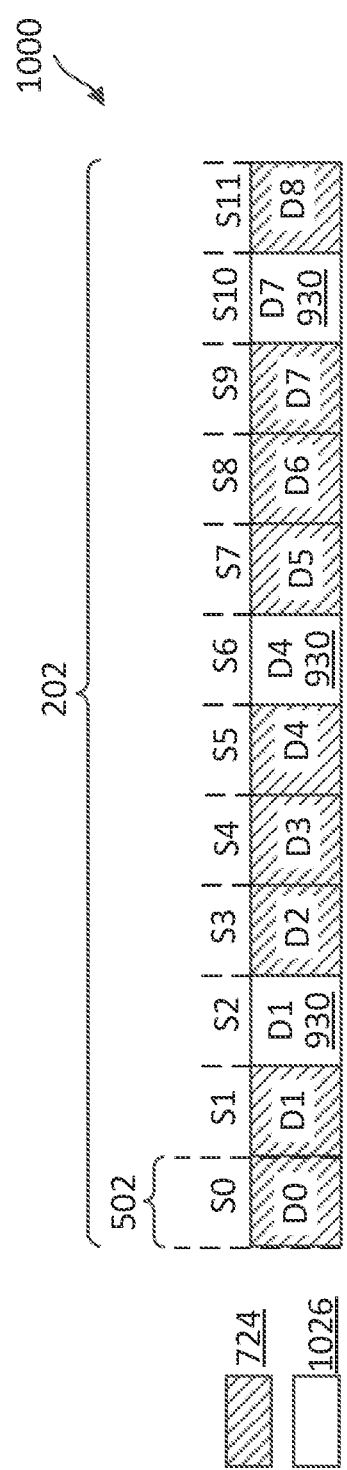
FIG. 10 is a timing diagram illustrating a UL transmission scheme according to some embodiments of the present disclosure.

FIG. 10 is a timing diagram illustrating a UL transmission scheme 1000 according to some embodiments of the present disclosure. The scheme 1000 may be employed by the UEs 115 and 300 and the BSs 105 and 400. The scheme 1000 can be used in conjunction with the schemes 500 or 600. The scheme 1000 is illustrated using a substantially similar slot and allocation configuration as in the schemes 700, 800, and 900. Similar to the scheme 900, the BS may configure the UE to transmit a filler signal 1026 including a repetition of a portion of the UL data signal 724. However, the BS may configure the UE to transmit the filler signal 1026 within the UL data signal 724. As shown, the filler signal 1026 includes multiple portions or symbols 502 spaced apart within the UL data signal 724, where a repetition of a data symbol 502 may follow the data symbol 502 to ease implementation. For example, the repeating symbol D1 930 follows the symbol D1 502 of the UL data signal 724. Similarly, the repeating symbol D4 930 follows the symbol D4 502 of the UL data signal 724.

As can be seen, the symbol location and the number of DMRSs and/or data symbols in a UL transmission may vary depending on whether the scheme 700, 800, 900, or 1000 is used. However, all data symbols (e.g., D0 to D8) are transmitted at least once. When a data symbol (e.g., D1, D4, and D7) is repeated in a filler signal (e.g., the filler signals 926 and 1026), the repeating data symbol (e.g., the repeating data symbols 930) is a copy of the original data symbol (e.g., encoded information bits) in a corresponding UL data signal. The inclusion of repeating data symbols or DMRSs in a filler signal can improve channel estimation performance, frequency offset estimation performance, and/or data demodulation performance at the BS's receiver.

While the schemes 700-1000 are described in the context of the scheme 500, the mechanisms for transmitting filler data, repeating data symbols, and/or DMRSs in the filler signals are suitable for use with the scheme 600.

Figure 11:
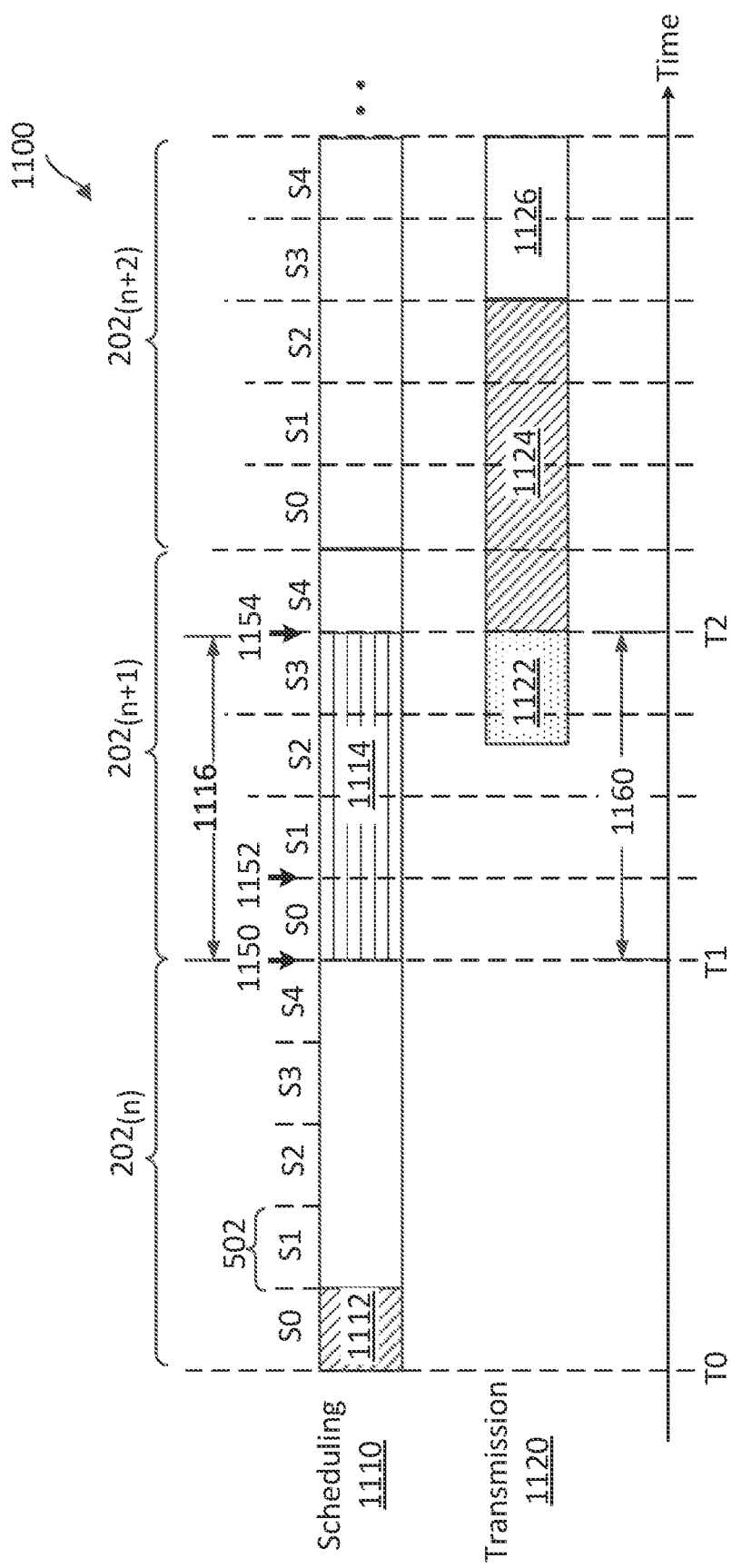
FIG. 11 is a timing diagram illustrating a UL transmission scheme according to some embodiments of the present disclosure.

While the schemes 500-1000 are described in the context of limiting a starting symbol configuration such that a UL data (e.g., PUSCH or a long PUCCH) transmission fits into the duration of a transmission slot, in some embodiments, a staring symbol configuration may not have the same limitation. For example, a certain candidate starting symbol may require a UE to apply puncturing so that a UL data transmission can be within a transmission slot. Alternatively, a certain starting symbol configuration may allow an allocation to span multiple transmission slots as shown in FIG. 11 below.

In addition, while the schemes 500-1000 are illustrated with a UL transmission including a UL data signal (e.g., the UL data signals 524, 624 and 724) and a filler signal (e.g., the filler signals 526, 626, 726, 826, 926, and 1026) completing at the end of a transmission slot (e.g., the transmission slots 202), in some embodiments, there may be a gap time before a next transmission slot. The gap time can allow a UE with an allocation in a next transmission slot to perform LBT. Alternatively, a BS may configure a UE to transmit a SRS or a PUCCH signal in the gap time.

As described above, a UE (e.g., the UEs 115 and 300) may apply rate match for a particular TB size based on a number of symbols available after passing an LBT, apply rate match for a particular TB size based on a UL grant, apply puncturing, or generate TB based on an allocation with a given TB size or a given number of symbols. However, a UE may also apply a combination of the mechanisms described above. In an embodiment, a UE may determine whether to rate match after passing an LBT based on a number of remaining symbols in an allocated transmission slot.

For example, the UE may require 2 symbol time to process a rate match. When the UE passes an LBT and there are 10 symbols remaining in a transmission slot, the UE may rate match for a TB size corresponding to 8 symbols instead of a reduced allocation size given in a grant. The UE may transmit 2 filler symbols while processing the rate match and continue to transmit the 8 rate-matched symbols. Alternatively, when the UE passes an LBT later in the transmission slot, the UE may apply puncturing or continue with the TB prepared based on the reduced allocation size given in a grant. In addition, the UE may determine whether to transmit filler symbols at the end of the transmission slot based on whether the UE has a grant for a subsequent transmission slot. For example, the UE may transmit filler symbols at the end of a transmission slot to occupy the medium when the UE has a scheduled grant for a subsequent transmission slot.

As another example consider the case when UE is allowed to start at symbol 0, 2, 7, 10 for a slot with 14 symbols and needs two symbol time for rate matching. The UE may initially create a rate matches PUSCH with all 14 symbols. When LBT passes at symbol 0, the UE sends the full PUSCH. When LBT passes at symbol 2, the UE sends punctured PUSCH or sends all 14 PUSCH symbols with 2 symbols occupying the next slot. However, if LBT fails at symbols 0 and 2, the UE knows that the next start symbol is at symbol 7. Hence, the UE can create a new rate matched packet corresponding to a length of 7 symbols. If LBT only passes at symbol 7, the UE can transmit the reduced-size packet of 7 symbols. If LBT passes at symbol 10, the UE can transmit he reduced-size packet with puncturing or allow some of the symbols to occupy the next slot.

FIG. 11 is a timing diagram illustrating a UL scheduling and transmission scheme 1100 according to some embodiments of the present disclosure. In FIG. 11, the x-axis represents time in some constant units. The scheme 1100 may be employed by the UEs 115 and 300 and the BSs 105 and 400. Similar to the scheme 500, the scheduling timeline 1110 shows a BS transmitting a UL grant 1112 to a UE in a transmission slot $202_{(n)}$ (e.g., beginning at time T0). The UL grant 1112 indicates an allocation 1114 with a shortened duration 1116 (e.g., including about four symbols 502) allowable candidate starting symbols 1150, 1152, and 1154 (e.g., S0, S1, and S4) in a transmission slot $202_{(n+1)}$ (e.g., beginning at time T1). However, in the scheme 1100, the BS may allow a transmission to span multiple transmission slots 202 instead of limiting a transmission to be within a single transmission slot 202.

The transmission timeline 1120 shows an example of the UE completing an LBT procedure 1122 at time T2 with a successful result. The time T2 corresponds to the last allowable starting symbol 1154 in the transmission slot $202_{(n+1)}$. Thus, the UE transmits a UL data signal 1124 (e.g., a PUSCH signal or a long PUCCH signal) beginning at the candidate starting symbol 1154. As shown, the UL data signal 1124 includes a duration of 4 symbols 502 and spans across transmission slots $202_{(n+2)}$ and $202_{(n+2)}$. The UE may transmit a filler signal 1126 until the end of the transmission slot $202_{(n+2)}$.

Figure 12:
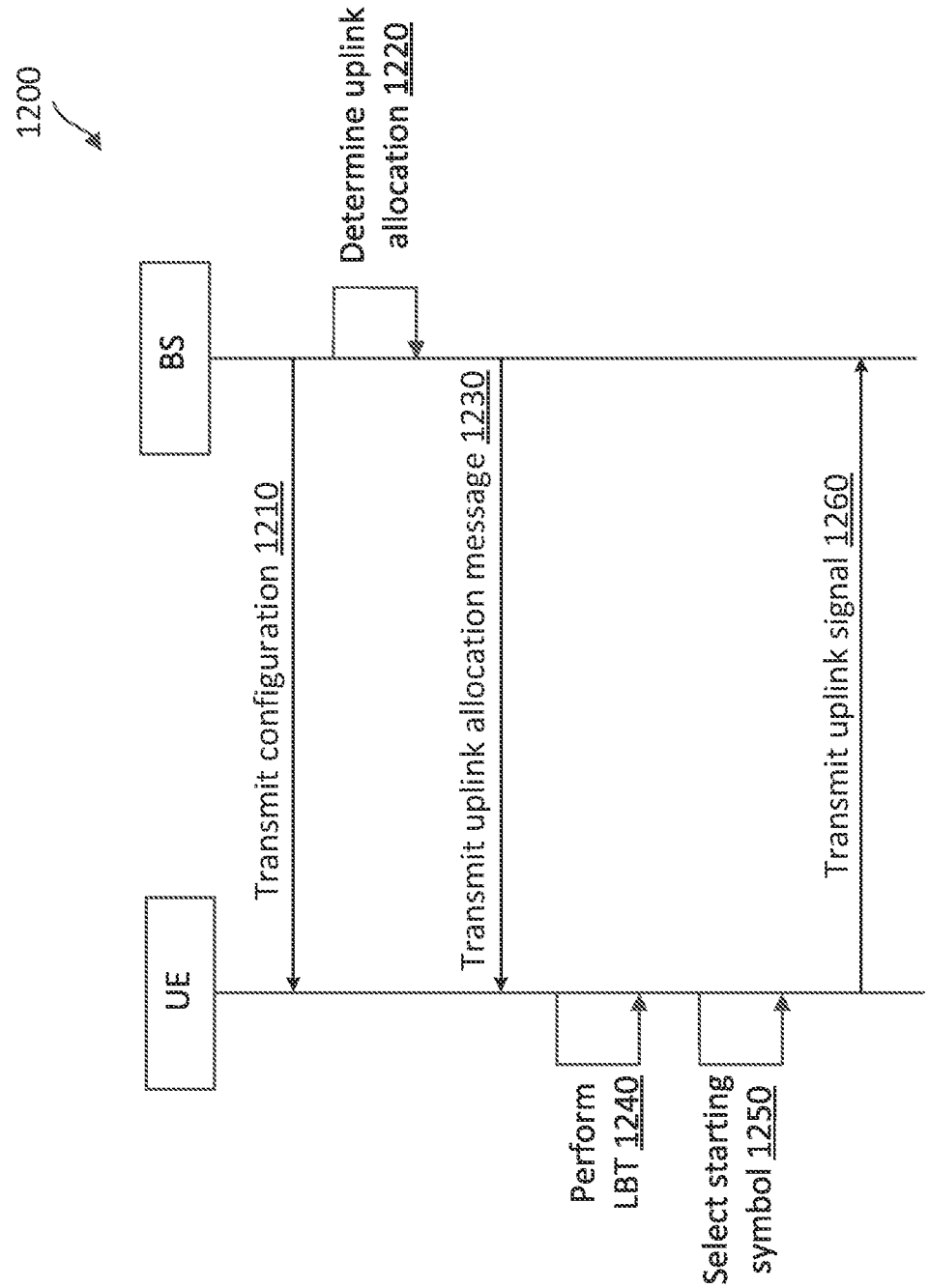
FIG. 12 is a signaling diagram of a UL communication method according to some embodiments of the present disclosure.

FIG. 12 is a signaling diagram of a UL communication method 1200 according to some embodiments of the present disclosure. The method 1200 is implemented by a BS (e.g., the BSs 105 and 400) and a UE (e.g., the UEs 115 and 300) in a network (e.g., the network 100). Steps of the method 1200 can be executed by computing devices (e.g., a processor, processing circuit, and/or other suitable component) of the BS and the UE. As illustrated, the method 1200 includes a number of enumerated steps, but embodiments of the method 1200 may include additional steps before, after, and in between the enumerated steps. In some embodiments, one or more of the enumerated steps may be omitted or performed in a different order.

At step 1210, the BS transmits a configuration for UL transmission. The configuration can indicate how a UE may transmit a filler signal (e.g., the filler signals 526, 626, 726, 826, 926, 1026, and 1126) along with a UL data signal (e.g., the UL data signals 524, 624, 724, and 1124) in a UL transmission. For example, the configuration may include filler data (e.g., the filler data 730), DMRSs (e.g., the DMRSs 830), or copies of data symbols (e.g., the repeating data symbols 930) carried in a corresponding UL data signal.

The configuration may indicate whether a filler signal may be transmitted after a UL data signal (e.g., as shown in the schemes 500, 700, 800, 900, and 1100), before a UL data signal (e.g., as shown in the schemes 500 and 600), or within a UL data signal (e.g., as shown in the scheme 1000).

The configuration may indicate whether a DMRS may be generated as a function of symbol index (e.g., relative to a start of a transmission slot 202) where the DMRS is transmitted or as a function of a relative symbol index from the start of a corresponding UL data signal. The configuration may indicate whether a DMRS in a filler signal may be a repeat of a DMRS in a corresponding UL data signal or a different DMRS generated from a different scrambling sequence than a DMRS in a corresponding UL data signal.

At step 1220, the BS determines a UL allocation (e.g., the allocation 514, 614, 714, and 1114) in a transmission slot (e.g., the transmission slots 202) for a UE.

At step 1230, the BS transmits a message (e.g., the UL grants 512 and 612) indicating the UL allocation. In an embodiment, the message may include a bit indicating whether the starting symbol (e.g., the starting symbols 550, 552, 554, 604, 1150, 1152, 1154) for the UL allocation is fixed or may vary while a UL allocation may fit within the transmission slot. In an embodiment, the message may include a set of bits indicating a set of candidate or allowable starting symbols for the UL allocation. For example, the starting symbol may be any symbol in a range of symbols (e.g., the symbols 502) within the transmission slot, a set of non-contiguous symbols within the range. In some embodiments, the starting symbol information may be jointly coded with time and/or frequency resources allocated for the UL allocation. In some embodiments, the configuration may be transmitting in an RRC message and the UL allocation may be transmitted via a downlink control information (DCI) message (e.g., a UL grant) in a PDCCH. In some embodiments, the configuration and the UL allocation message may be transmitted in the same message.

At step 1240, the UE may perform an LBT procedure, for example, before the beginning of the transmission slot in which the UL allocation is located.

At step 1250, when the LBT is successful, the UE may select a starting symbol from among the candidate starting symbols indicated in the UL allocation message.

At step 1260, the UE transmits a UL communication signal including a UL data signal (e.g., a PUSCH or long PUCCH signal) and a filler signal based on the UL allocation message. The UL transmission may be similar to the transmission shown in the schemes 500, 600, 700, 800, 900, 1000, 1100, and/or 1200.

Figure 13:
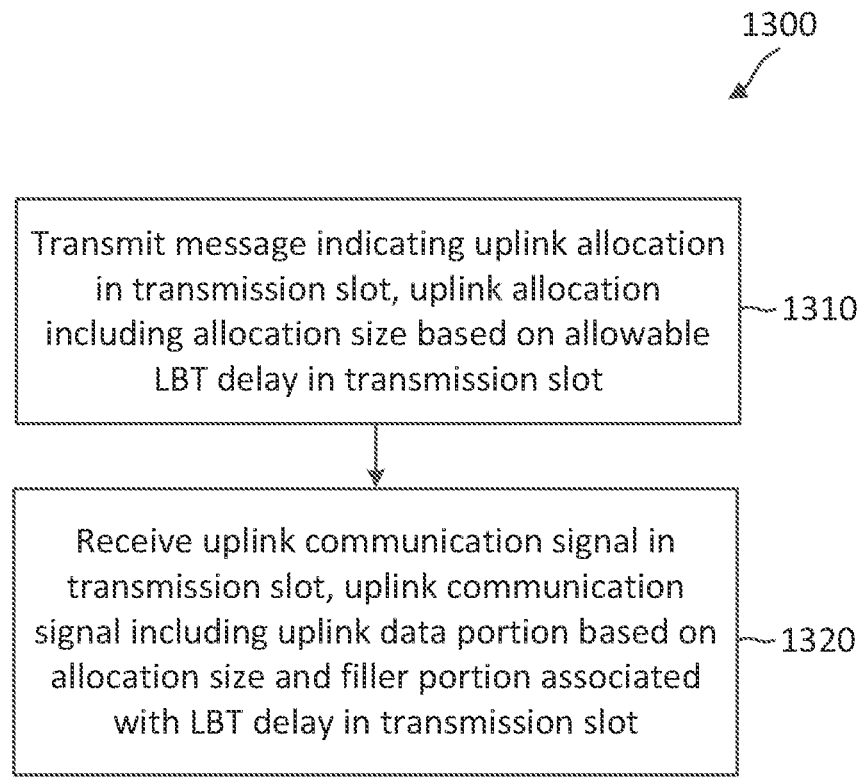
FIG. 13 is a flow diagram of a UL communication method according to embodiments of the present disclosure.

FIG. 13 is a flow diagram of a UL communication method 1300 according to embodiments of the present disclosure. Steps of the method 1300 can be executed by a computing device (e.g., a processor, processing circuit, and/or other suitable component) of a wireless communication device or other suitable means for performing the steps. For example, a wireless communication device, such as the BS 105 or the BS 400, may utilize one or more components, such as the processor 402, the memory 404, the uplink processing module 408, the transceiver 410, the modem 412, and the one or more antennas 416, to execute the steps of method 1300. The method 1300 may employ similar mechanisms as in the schemes 500, 600, 700, 800, 900, 1000, 1100, and/or the method 1200 described with respect to FIGS. 5, 6, 7, 8, 9, 10, 11, and/or 12, respectively. As illustrated, the method 1300 includes a number of enumerated steps, but embodiments of the method 1300 may include additional steps before, after, and in between the enumerated steps. In some embodiments, one or more of the enumerated steps may be omitted or performed in a different order.

At step 1310, the method 1300 includes transmitting, by a first wireless communication device to a second wireless communication device, a message indicating a UL allocation (e.g., the UL allocations 514, 614, 714, and 1114) in a transmission slot (e.g., the transmission slots 202). The UL allocation includes an allocation size based on an allowable LBT delay (e.g., the delays 560, 602, and 1160) in the transmission slot. The first wireless communication device may correspond to a BS 105 and the second wireless communication device may correspond to a UE 115. The allocation size may correspond to the duration 516, 616, or 1116.

At step 1320, the method 1300 includes receiving, by the first wireless communication device from the second wireless communication device, a UL communication signal in the transmission slot. The UL communication signal includes a UL data portion (e.g., the UL data signals 524, 624, 724, and 1124) based on the allocation size and a filler portion (e.g., the filler signals 526, 626, 726, 826, 926, 1026, and 1126) associated with an LBT delay (e.g., a LBT completion time at the second wireless communication device) in the transmission slot.

The filler portion can be received before the UL data portion, after the UL data portion, and/or within the UL data portion. The filler portion can include repetitions of encoded information (e.g., the repeating data symbols 930) in the UL data portion, pilot information (e.g., the DMRSs 830), and/or filler data (e.g., the filler data 730). The UL data portion can include PUSCH data (e.g., data information bits) or long PUCCH data (e.g., control information bits).

In an embodiment, the first wireless communication device can further determine one or more candidate starting symbols (e.g., the candidate starting symbols 550, 552, 554, and 604) within the transmission slot for the UL allocation based on the allowable LBT delay. The message can indicate the candidate starting symbols in various formats. For example, the message can indicate a symbol range (e.g., from symbols 502 indexed S0 to S4) for the candidate starting symbols. The message can indicate a set of allowable symbols within the range. The set may include all symbols within the range, a subset of contiguous symbols within the range, or a subset of non-contiguous symbols within the range. In an embodiment, the first wireless communication device can further perform blind detection based on the candidate starting symbols.

In an embodiment, the first wireless communication device can further determine a channel estimate based on pilot information in the UL communication signal. The pilot information may be associated with a scrambling sequence. The pilot information may be generated from the scrambling sequence independent of a starting symbol of the UL data portion. Alternatively, the pilot information may be generated from the scrambling sequence as a function of a symbol index within the transmission slot.

In an embodiment, the first wireless communication device can further transmit a message indicating a configuration for transmitting at last one of filler data, a repetition of UL data, or pilot information in the filler portion.

Figure 14:
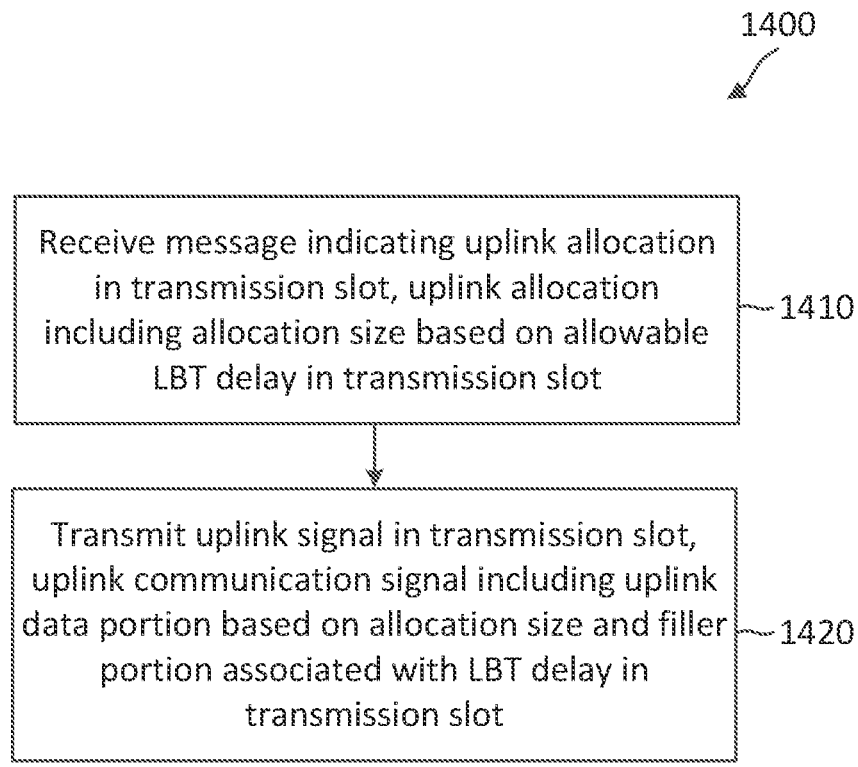
FIG. 14 is a flow diagram of a UL communication method according to embodiments of the present disclosure.

FIG. 14 is a flow diagram of a UL communication method 1400 according to embodiments of the present disclosure. Steps of the method 1400 can be executed by a computing device (e.g., a processor, processing circuit, and/or other suitable component) of a wireless communication device or other suitable means for performing the steps. For example, a wireless communication device, such as the UE 115 or UE 300, may utilize one or more components, such as the processor 302, the memory 304, the uplink processing module 308, the transceiver 310, the modem 312, and the one or more antennas 316, to execute the steps of method 1400. The method 1400 may employ similar mechanisms as in the schemes 500, 600, 700, 800, 900, 1000, and 1100, and/or the method 1200 described with respect to FIGS. 5, 6, 7, 8, 9, 10, 11, and/or 12, respectively. As illustrated, the method 1400 includes a number of enumerated steps, but embodiments of the method 1400 may include additional steps before, after, and in between the enumerated steps. In some embodiments, one or more of the enumerated steps may be omitted or performed in a different order.

At step 1410, the method 1400 includes receiving, by a first wireless communication device from a second wireless communication device, a message indicating a UL allocation (e.g., the UL allocations 514, 614, 714, and 1114) in a transmission slot (e.g., the transmission slots 202). The UL allocation includes an allocation size based on an allowable LBT delay (e.g., the delays 560, 602, and 1160) in the transmission slot. The first wireless communication device may correspond to a UE 115 and the second wireless communication device may correspond to a BS 105. The allocation size may correspond to the durations 516, 616, or 1116.

At step 1420, the method 1400 includes transmitting, by the first wireless communication device from the second wireless communication device, a UL communication signal in the transmission slot. The UL communication signal includes a UL data portion (e.g., the UL data signals 524, 624, and 724) based on the allocation size and a filler portion (e.g., the filler signals 526, 626, 726, 826, 926, and 1026) based on an LBT delay (e.g., a LBT completion time at the first wireless communication device) in the transmission slot.

The filler portion can be received before the UL data portion, after the UL data portion, and/or within the UL data portion. The filler portion can include repetitions of encoded information (e.g., the repeating data symbols 930) in the UL data portion, pilot information (e.g., the DMRSs 830), and/or filler data (e.g., the filler data 730). The UL data portion can include PUSCH data or long PUCCH data.

In an embodiment, the first wireless communication device can further perform an LBT procedure before transmitting the UL communication signal. The first wireless communication device can determine a duration of the filler portion based on a completion of the LBT procedure. The first wireless communication device can select a starting symbol from among a plurality of candidate starting symbols in the message based on the completion time of the LBT procedure.

In an embodiment, the first wireless communication device can further transmit pilot information in the UL data portion based on a scrambling sequence independent of a starting symbol of the UL data portion within the transmission slot.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a method of wireless communication, comprising transmitting, by a first wireless communication device to a second wireless communication device, a message indicating an uplink allocation in a transmission slot, the uplink allocation including an allocation size based on an allowable listen-before-talk (LBT) delay in the transmission slot; and receiving, by the first wireless communication device from the second wireless communication device, an uplink communication signal in the transmission slot, the uplink communication signal including an uplink data portion based on the allocation size and a filler portion associated with an LBT delay in the transmission slot.

In some embodiments, wherein the receiving further includes receiving the filler portion before the uplink data portion. In some embodiments, wherein the receiving further includes receiving the filler portion after the uplink data portion. In some embodiments, wherein the receiving further includes receiving the filler portion within the uplink data portion. In some embodiments, wherein the receiving further includes receiving pilot information in the filler portion. In some embodiments, wherein the receiving further includes receiving uplink data in the uplink data portion; and receiving a repetition of at least a portion of the uplink data in the filler portion. In some embodiments, the method further comprises determining, by the first wireless communication device, one or more candidate starting symbols within the transmission slot for the uplink allocation based on the allowable LBT delay, wherein the message indicates the one or more candidate starting symbols. In some embodiments, wherein the message indicates a symbol range within the transmission slot, and wherein the one or more candidate starting symbols are within the symbol range. In some embodiments, wherein the receiving includes performing, by the first wireless communication device, blind detection based on the one or more candidate starting symbols. In some embodiments, the method further comprises determining, by the first wireless communication device, a channel estimate based on pilot information in the uplink communication signal, the pilot information associated with a scrambling sequence independent of a starting symbol of the uplink data portion. In some embodiments, the method further comprises transmitting, by the first wireless communication device, a message indicating a configuration for transmitting at least one of filler data, a repetition of uplink data, or pilot information in the filler portion. In some embodiments, wherein the uplink data portion is associated with at least one of a physical uplink shared channel (PUSCH) or a long physical uplink control channel (PUCCH).

Further embodiments of the present disclosure include a method of wireless communication, comprising receiving, by a first wireless communication device from a second wireless communication device, a message indicating an uplink allocation in a transmission slot, the uplink allocation including an allocation size based on an allowable listen-before-talk (LBT) delay in the transmission slot; and transmitting, by the first wireless communication device to the second wireless communication device, an uplink communication signal in the transmission slot, the uplink communication signal including an uplink data portion based on the allocation size and a filler portion based on an LBT delay in the transmission slot.

In some embodiments, wherein the transmitting further includes transmitting the filler portion before the uplink data portion. In some embodiments, wherein the transmitting further includes transmitting the filler portion after the uplink data portion. In some embodiments, wherein the transmitting further includes transmitting the uplink communication signal including the filler portion within the uplink data portion. In some embodiments, wherein the transmitting further includes transmitting pilot information in the filler portion. In some embodiments, wherein the transmitting further includes transmitting uplink data in the uplink data portion; and transmitting a repetition of at least a portion of the uplink data in the filler portion. In some embodiments, the method further comprises performing, by the first wireless communication device, an LBT procedure before transmitting the uplink communication signal; and determining, by the first wireless communication device, a duration of the filler portion based on a completion time of the LBT procedure. In some embodiments, wherein the message indicates one or more candidate starting symbols within the transmission slot for the uplink allocation based on the allowable LBT delay. In some embodiments, wherein the message indicates a symbol range within the transmission slot, and wherein the one or more candidate starting symbols are within the symbol range. In some embodiments, the method further comprises selecting, by the first wireless communication device, a starting symbol from among the one or more candidate starting symbols based on the completion time of the LBT procedure, wherein the transmitting includes transmitting the uplink data portion beginning at the selected starting symbol. In some embodiments, wherein the transmitting includes transmitting pilot information in the uplink data portion based on a scrambling sequence independent of a starting symbol of the uplink data portion within the transmission slot. In some embodiments, wherein the uplink data portion is associated with at least one of a physical uplink shared channel (PUSCH) or a long physical uplink control channel (PUCCH).

Further embodiments of the present disclosure include an apparatus comprising a transceiver configured to transmit, to a second wireless communication device, a message indicating an uplink allocation in a transmission slot, the uplink allocation including an allocation size based on an allowable listen-before-talk (LBT) delay in the transmission slot; and receive, from the second wireless communication device, an uplink communication signal in the transmission slot, the uplink communication signal including an uplink data portion based on the allocation size and a filler portion associated with an LBT delay in the transmission slot.

In some embodiments, wherein the transceiver is further configured to receive the uplink communication signal by receiving the filler portion before the uplink data portion. In some embodiments, wherein the transceiver is further configured to receive the uplink communication signal by receiving the filler portion after the uplink data portion. In some embodiments, wherein the transceiver is further configured to receive the uplink communication signal by receiving the filler portion within the uplink data portion. In some embodiments, wherein the transceiver is further configured to receive the uplink communication signal by receiving pilot information in the filler portion. In some embodiments, wherein the transceiver is further configured to receive the uplink communication signal by receiving uplink data in the uplink data portion; and receiving a repetition of at least a portion of the uplink data in the filler portion. In some embodiments, the apparatus further comprises a processor configured to determine one or more candidate starting symbols within the transmission slot for the uplink allocation based on the allowable LBT delay, wherein the message indicates the one or more candidate starting symbols. In some embodiments, wherein the message indicates a symbol range within the transmission slot, and wherein the one or more candidate starting symbols are within the symbol range. In some embodiments, wherein the processor is further configured to perform blind detection based on the one or more candidate starting symbols. In some embodiments, the apparatus further comprises a processor configured to determine a channel estimate based on pilot information in the uplink communication signal, the pilot information associated with a scrambling sequence independent of a starting symbol of the uplink data portion. In some embodiments, wherein the transceiver is further configured to transmit a message indicating a configuration for transmitting at least one of filler data, a repetition of uplink data, or pilot information in the filler portion. In some embodiments, wherein the uplink data portion is associated with at least one of a physical uplink shared channel (PUSCH) or a long physical uplink control channel (PUCCH).

Further embodiments of the present disclosure include an apparatus comprising a transceiver configured to receive, from a second wireless communication device, a message indicating an uplink allocation in a transmission slot, the uplink allocation including an allocation size based on an allowable listen-before-talk (LBT) delay in the transmission slot; and transmit, to the second wireless communication device, an uplink communication signal in the transmission slot, the uplink communication signal including an uplink data portion based on the allocation size and a filler portion based on an LBT delay in the transmission slot.

In some embodiments, wherein the transceiver is further configured to transmit the uplink communication signal by transmitting the filler portion before the uplink data portion. In some embodiments, wherein the transceiver is further configured to transmit the uplink communication signal by transmitting the filler portion after the uplink data portion. In some embodiments, wherein the transceiver is further configured to transmit the uplink communication signal by transmitting the filler portion within the uplink data portion. In some embodiments, wherein the transceiver is further configured to transmit the uplink communication signal by transmitting pilot information in the filler portion. In some embodiments, wherein the transceiver is further configured to transmit the uplink communication signal by transmitting uplink data in the uplink data portion; and transmitting a repetition of at least a portion of the uplink data in the filler portion. In some embodiments, the apparatus further comprises a processor configured to perform an LBT procedure before transmitting the uplink communication signal; and determine a duration of the filler portion based on a completion time of the LBT procedure. In some embodiments, wherein the message indicates one or more candidate starting symbols within the transmission slot for the uplink allocation based on the allowable LBT delay. In some embodiments, wherein the message indicates a symbol range within the transmission slot, and wherein the one or more candidate starting symbols are within the symbol range. In some embodiments, wherein the processor is further configured to select a starting symbol from among the one or more candidate starting symbols based on the completion time of the LBT procedure, and wherein the transceiver is further configured to transmit the uplink communication signal by transmitting the uplink data portion beginning at the selected starting symbol. In some embodiments, wherein the transceiver is further configured to transmit the uplink communication signal by transmitting pilot information in the uplink data portion based on a scrambling sequence independent of a starting symbol of the uplink data portion within the transmission slot. In some embodiments, wherein the uplink data portion is associated with at least one of a physical uplink shared channel (PUSCH) or a long physical uplink control channel (PUCCH).

Further embodiments of the present disclosure include a computer-readable medium having program code recorded thereon, the program code comprising code for causing a first wireless communication device to transmit, to a second wireless communication device, a message indicating an uplink allocation in a transmission slot, the uplink allocation including an allocation size based on an allowable listen-before-talk (LBT) delay in the transmission slot; and code for causing the first wireless communication device to receive, from the second wireless communication device, an uplink communication signal in the transmission slot, the uplink communication signal including an uplink data portion based on the allocation size and a filler portion associated with an LBT delay in the transmission slot.

In some embodiments, wherein the code for causing the first wireless communication device to receive the uplink communication signal is further configured to receive the filler portion before the uplink data portion. In some embodiments, wherein the code for causing the first wireless communication device to receive the uplink communication signal is further configured to receive the filler portion after the uplink data portion. In some embodiments, wherein the code for causing the first wireless communication device to receive the uplink communication signal is further configured to receive the filler portion within the uplink data portion. In some embodiments, wherein the code for causing the first wireless communication device to receive the uplink communication signal is further configured to receive pilot information in the filler portion. In some embodiments, wherein the code for causing the first wireless communication device to receive the uplink communication signal is further configured to receive uplink data in the uplink data portion; and receive a repetition of at least a portion of the uplink data in the filler portion. In some embodiments, the computer-readable medium further comprises code for causing the first wireless communication device to determine one or more candidate starting symbols within the transmission slot for the uplink allocation based on the allowable LBT delay, wherein the message indicates the one or more candidate starting symbols. In some embodiments, wherein the message indicates a symbol range within the transmission slot, and wherein the one or more candidate starting symbols are within the symbol range. In some embodiments, the computer-readable medium further comprises code for causing the first wireless communication device to perform blind detection based on the one or more candidate starting symbols. In some embodiments, the computer-readable medium further comprises code for causing the first wireless communication device to determine a channel estimate based on pilot information in the uplink communication signal, the pilot information associated with a scrambling sequence independent of a starting symbol of the uplink data portion. In some embodiments, the computer-readable medium further comprises code for causing the first wireless communication device to transmit a message indicating a configuration for transmitting at least one of filler data, a repetition of uplink data, or pilot information in the filler portion. In some embodiments, wherein the uplink data portion is associated with at least one of a physical uplink shared channel (PUSCH) or a long physical uplink control channel (PUCCH).

Further embodiments of the present disclosure include a computer-readable medium having program code recorded thereon, the program code comprising code for causing a first wireless communication device to receive, from a second wireless communication device, a message indicating an uplink allocation in a transmission slot, the uplink allocation including an allocation size based on an allowable listen-before-talk (LBT) delay in the transmission slot; and code for causing the first wireless communication device to transmit, to the second wireless communication device, an uplink communication signal in the transmission slot, the uplink communication signal including an uplink data portion based on the allocation size and a filler portion based on an LBT delay in the transmission slot.

In some embodiments, wherein the code for causing the first wireless communication device to transmit the uplink communication signal is further configured to transmit the filler portion before the uplink data portion. In some embodiments, wherein the code for causing the first wireless communication device to transmit the uplink communication signal is further configured to transmit the filler portion after the uplink data portion. In some embodiments, wherein the code for causing the first wireless communication device to transmit the uplink communication signal is further configured to transmit the uplink communication signal including the filler portion within the uplink data portion. In some embodiments, wherein the code for causing the first wireless communication device to transmit the uplink communication signal is further configured to transmit pilot information in the filler portion. In some embodiments, wherein the code for causing the first wireless communication device to transmit the uplink communication signal is further configured to transmit uplink data in the uplink data portion; and transmit a repetition of at least a portion of the uplink data in the filler portion. In some embodiments, the computer-readable medium further comprises code for causing the first wireless communication device to perform an LBT procedure before transmitting the uplink communication signal; and code for causing the first wireless communication device to determine a duration of the filler portion based on a completion time of the LBT procedure. In some embodiments, wherein the message indicates one or more candidate starting symbols within the transmission slot for the uplink allocation based on the allowable LBT delay. In some embodiments, wherein the message indicates a symbol range within the transmission slot, and wherein the one or more candidate starting symbols are within the symbol range. In some embodiments, the computer-readable medium further comprises code for causing the first wireless communication device to select a starting symbol from among the one or more candidate starting symbols based on the completion time of the LBT procedure, wherein the code for causing the first wireless communication device to transmit the uplink communication signal is further configured to transmit the uplink data portion beginning at the selected starting symbol. In some embodiments, wherein the code for causing the first wireless communication device to transmit the uplink communication signal is further configured to transmit pilot information in the uplink data portion based on a scrambling sequence independent of a starting symbol of the uplink data portion within the transmission slot. In some embodiments, wherein the uplink data portion is associated with at least one of a physical uplink shared channel (PUSCH) or a long physical uplink control channel (PUCCH).

Further embodiments of the present disclosure include an apparatus comprising means for transmitting, to a second wireless communication device, a message indicating an uplink allocation in a transmission slot, the uplink allocation including an allocation size based on an allowable listen-before-talk (LBT) delay in the transmission slot; and means for receiving, from the second wireless communication device, an uplink communication signal in the transmission slot, the uplink communication signal including an uplink data portion based on the allocation size and a filler portion associated with an LBT delay in the transmission slot.

In some embodiments, wherein the means for receiving the uplink communication signal is further configured to receive the filler portion before the uplink data portion. In some embodiments, wherein the means for receiving the uplink communication signal is further configured to receive the filler portion after the uplink data portion. In some embodiments, wherein the means for receiving the uplink communication signal is further configured to receive the filler portion within the uplink data portion. In some embodiments, wherein the means for receiving the uplink communication signal is further configured to receive pilot information in the filler portion. In some embodiments, wherein the means for receiving the uplink communication signal is further configured to receive uplink data in the uplink data portion; and receive a repetition of at least a portion of the uplink data in the filler portion. In some embodiments, the apparatus further comprises means for determining one or more candidate starting symbols within the transmission slot for the uplink allocation based on the allowable LBT delay, wherein the message indicates the one or more candidate starting symbols. In some embodiments, wherein the message indicates a symbol range within the transmission slot, and wherein the one or more candidate starting symbols are within the symbol range. In some embodiments, the apparatus further comprises means for performing blind detection based on the one or more candidate starting symbols. In some embodiments, the apparatus further comprises means for determining a channel estimate based on pilot information in the uplink communication signal, the pilot information associated with a scrambling sequence independent of a starting symbol of the uplink data portion. In some embodiments, the apparatus further comprises means for transmitting a message indicating a configuration for transmitting at least one of filler data, a repetition of uplink data, or pilot information in the filler portion. In some embodiments, wherein the uplink data portion is associated with at least one of a physical uplink shared channel (PUSCH) or a long physical uplink control channel (PUCCH).

Further embodiments of the present disclosure include an apparatus comprising means for receiving, from a second wireless communication device, a message indicating an uplink allocation in a transmission slot, the uplink allocation including an allocation size based on an allowable listen-before-talk (LBT) delay in the transmission slot; and means for transmitting, to the second wireless communication device, an uplink communication signal in the transmission slot, the uplink communication signal including an uplink data portion based on the allocation size and a filler portion based on an LBT delay in the transmission slot.

In some embodiments, wherein the means for transmitting the uplink communication signal is further configured to transmit the filler portion before the uplink data portion. In some embodiments, wherein the means for transmitting the uplink communication signal is further configured to transmit the filler portion after the uplink data portion. In some embodiments, wherein the means for transmitting the uplink communication signal is further configured to transmit the uplink communication signal including the filler portion within the uplink data portion. In some embodiments, wherein the means for transmitting the uplink communication signal is further configured to transmit pilot information in the filler portion. In some embodiments, wherein the means for transmitting the uplink communication signal is further configured to transmit uplink data in the uplink data portion; and transmit a repetition of at least a portion of the uplink data in the filler portion. In some embodiments, the apparatus further comprises means for performing an LBT procedure before transmitting the uplink communication signal; and means for determining a duration of the filler portion based on a completion time of the LBT procedure. In some embodiments, wherein the message indicates one or more candidate starting symbols within the transmission slot for the uplink allocation based on the allowable LBT delay. In some embodiments, wherein the message indicates a symbol range within the transmission slot, and wherein the one or more candidate starting symbols are within the symbol range. In some embodiments, the apparatus further comprises means for selecting a starting symbol from among the one or more candidate starting symbols based on the completion time of the LBT procedure, wherein the means for transmitting the uplink communication signal is further configured to transmit the uplink data portion beginning at the selected starting symbol. In some embodiments, wherein the means for transmitting the uplink communication signal is further configured to transmit pilot information in the uplink data portion based on a scrambling sequence independent of a starting symbol of the uplink data portion within the transmission slot. In some embodiments, wherein the uplink data portion is associated with at least one of a physical uplink shared channel (PUSCH) or a long physical uplink control channel (PUCCH).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
transmitting, by a first wireless communication device to a second wireless communication device, a message indicating an uplink allocation in a transmission slot, the uplink allocation including an allocation size and two or more candidate starting symbols within the transmission slot; and
receiving, by the first wireless communication device from the second wireless communication device, an uplink communication signal in the transmission slot, the uplink communication signal including:
an uplink data portion based on the allocation size and a starting symbol of the two or more candidate starting symbols, the starting symbol based on a listen-before-talk (LBT) completion time; and
a filler portion based on the LBT completion time in the transmission slot, wherein the filler portion includes at least one of a repetition of a first data symbol of the uplink data portion or a pilot symbol.

2. The method of claim 1, wherein the receiving further includes at least one of:
receiving the filler portion before the uplink data portion;
receiving the filler portion after the uplink data portion; or
receiving the filler portion within the uplink data portion.

3. The method of claim 1, wherein the receiving further includes:
receiving one or more data symbols in the uplink data portion, the one or more data symbols including uplink data and first pilot information, wherein the one or more data symbols includes the first data symbol; and
receiving the filler portion including at least one of:
the pilot symbol including second pilot information; or
the repetition of the first data symbol.

4. The method of claim 1, further comprising:
determining, by the first wireless communication device, the starting symbol of the one or more candidate starting symbols based on the LBT completion time.

5. The method of claim 4, wherein the message indicates at least one of:
a symbol range within the transmission slot, the symbol range including the one or more candidate starting symbols.

6. The method of claim 4, wherein the receiving includes:
performing, by the first wireless communication device, blind detection based on the one or more candidate starting symbols.

7. The method of claim 1, further comprising:
determining, by the first wireless communication device, a channel estimate based on pilot information in the uplink communication signal, the pilot information associated with a scrambling sequence independent of the starting symbol of the uplink data portion.

8. The method of claim 1, further comprising:
transmitting, by the first wireless communication device, a message indicating a configuration for transmitting the at least one of the repetition of the first data symbol of the uplink data portion or the pilot symbol in the filler portion.

9. The method of claim 1, wherein the uplink data portion is associated with at least one of a physical uplink shared channel (PUSCH) or a long physical uplink control channel (PUCCH).

10. An apparatus comprising:
a transceiver configured to:
transmit, to a second wireless communication device, a message indicating an uplink allocation in a transmission slot, the uplink allocation including an allocation size and two or more candidate starting symbols within the transmission slot; and
receive, from the second wireless communication device, an uplink communication signal in the transmission slot, the uplink communication signal including:
an uplink data portion based on the allocation size and a starting symbol of the two or more candidate starting symbols, the starting symbol based on a listen-before-talk (LBT) completion time; and
a filler portion based on the LBT completion time in the transmission slot, wherein the filler portion includes at least one of a repetition of a first data symbol of the uplink data portion or a pilot symbol.

11. The apparatus of claim 10, wherein the transceiver is further configured to receive the uplink communication signal by at least one of:
receiving the filler portion before the uplink data portion;
receiving the filler portion after the uplink data portion; or
receiving the filler portion within the uplink data portion.

12. The apparatus of claim 10, wherein the transceiver is further configured to receive the uplink communication signal by:
receiving one or more data symbols in the uplink data portion, the one or more data symbols including uplink data and first pilot information, wherein the one or more data symbols includes the first data symbol; and
receiving the filler portion including at least one of:
the pilot symbol including second pilot information; or
the repetition of the first data symbol.

13. The apparatus of claim 10, further comprising:
a processor configured to determine the starting symbol of the one or more candidate starting symbols based on the LBT completion time,
wherein the message indicates at least one of:
a symbol range within the transmission slot, the symbol range including the one or more candidate starting symbols.

14. The apparatus of claim 10, further comprising:
a processor configured to determine a channel estimate based on pilot information in the uplink communication signal, the pilot information associated with a scrambling sequence independent of the starting symbol of the uplink data portion.

15. The apparatus of claim 10, wherein the transceiver is further configured to:
transmit a message indicating a configuration for transmitting the at least one of the repetition of the first data symbol of the uplink data portion or the pilot symbol in the filler portion.

16. A non-transitory computer-readable medium having program code recorded thereon, the program code comprising:
code for causing a first wireless communication device to transmit, to a second wireless communication device, a message indicating an uplink allocation in a transmission slot, the uplink allocation including an allocation size and two or more candidate starting symbols within the transmission slot; and
code for causing the first wireless communication device to receive, from the second wireless communication device, an uplink communication signal in the transmission slot, the uplink communication signal including:
an uplink data portion based on the allocation size and a starting symbol of the two or more candidate starting symbols, the starting symbol based on a listen-before-talk (LBT) completion time; and
a filler portion based on the LBT completion time in the transmission slot, wherein the filler portion includes at least one of a repetition of a first data symbol of the uplink data portion or a pilot symbol.

17. The non-transitory computer-readable medium of claim 16, wherein the code for causing the first wireless communication device to receive the uplink communication signal is configured to receive at least one of:
the filler portion before the uplink data portion;
the filler portion after the uplink data portion; or
the filler portion within the uplink data portion.

18. The non-transitory computer-readable medium of claim 16, wherein the code for causing the first wireless communication device to receive the uplink communication signal is configured to:
receive one or more data symbols in the uplink data portion, the one or more data symbols including uplink data and first pilot information, wherein the one or more data symbols includes the first data symbol; and
receive the filler portion including at least one of:
the pilot symbol including second pilot information; or
the repetition of the first data symbol.

19. The non-transitory computer-readable medium of claim 16, further comprising:
code for causing the first wireless communication device to determine the starting symbol of the one or more candidate starting symbols based on the LBT completion time, wherein the message indicates at least one of:
a symbol range within the transmission slot, the symbol range including the one or more candidate starting symbols.

20. The non-transitory computer-readable medium of claim 16, further comprising:
code for causing the first wireless communication device to transmit a message indicating a configuration for transmitting the at least one of the repetition of the first data symbol of the uplink data portion or the pilot symbol in the filler portion.

* * * * *